US010115215B2

(12) United States Patent
Matteson et al.

(10) Patent No.: US 10,115,215 B2
(45) Date of Patent: Oct. 30, 2018

(54) PAIRING FONTS FOR PRESENTATION

(71) Applicant: Monotype Imaging Inc., Woburn, MA (US)

(72) Inventors: Steve Matteson, Louisville, CO (US); Sampo Juhani Kaasila, Plaistow, NH (US); Evan Scronce, Woburn, MA (US); Anand Vijay, Madhya Pradesh (IN); Jitendra Kumar Bansal, Karauli (IN)

(73) Assignee: Monotype Imaging Inc., Woburn, MA (US)

( * ) Notice: Subject to any disclaimer, the term of this patent is extended or adjusted under 35 U.S.C. 154(b) by 188 days.

(21) Appl. No.: 14/690,260

(22) Filed: Apr. 17, 2015

(65) Prior Publication Data

US 2016/0307347 A1    Oct. 20, 2016

(51) Int. Cl.
| | | |
|---|---|---|
| *G06T 11/00* | (2006.01) | |
| *G06T 11/60* | (2006.01) | |
| *G06F 17/21* | (2006.01) | |
| *G06K 9/68* | (2006.01) | |
| *G06K 9/62* | (2006.01) | |
| *G06T 1/20* | (2006.01) | |
| *G06N 99/00* | (2010.01) | |

(52) U.S. Cl.
CPC ............ *G06T 11/60* (2013.01); *G06F 17/214* (2013.01); *G06K 9/627* (2013.01); *G06K 9/6215* (2013.01); *G06K 9/6267* (2013.01); *G06K 9/6828* (2013.01); *G06N 99/005* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 4,244,657 A | 1/1981 | Wasylyk | |
| 4,998,210 A | 3/1991 | Kadono | |
| 5,263,132 A * | 11/1993 | Parker | G06F 17/211 715/207 |
| 5,347,266 A | 9/1994 | Bauman et al. | |

(Continued)

FOREIGN PATENT DOCUMENTS

| | | |
|---|---|---|
| EP | 0949574 | 10/1999 |
| EP | 2166488 A2 | 3/2010 |

(Continued)

OTHER PUBLICATIONS

Typeconnection, "typeconnection", URL: http://web.archive.org/web/20150226074717/http://www.typeconnection.com/step1.php, Feb. 26, 2015.*

(Continued)

*Primary Examiner* — David H Chu
(74) *Attorney, Agent, or Firm* — Fish & Richardson P.C.

(57) ABSTRACT

A system includes a computing device that includes a memory configured to store instructions. The system also includes a processor to execute the instructions to perform operations that include attaining data representing features of a font capable of representing one or more glyphs. Operations also include determining a rating for pairing the font and at least one other font using machine learning, the features of the font, and one or more rules included in a set of rules.

51 Claims, 12 Drawing Sheets

(56) References Cited

U.S. PATENT DOCUMENTS

| | | | |
|---|---|---|---|
| 5,412,771 A | 5/1995 | Fenwick | |
| 5,416,898 A | 5/1995 | Opstad et al. | |
| 5,444,829 A | 8/1995 | Kawabata et al. | |
| 5,453,938 A | 9/1995 | Gohara et al. | |
| 5,526,477 A | 6/1996 | McConnell et al. | |
| 5,528,742 A | 6/1996 | Moore et al. | |
| 5,533,174 A | 7/1996 | Flowers et al. | |
| 5,586,242 A * | 12/1996 | McQueen, III | G06F 17/214 345/467 |
| 5,606,649 A | 2/1997 | Tai | |
| 5,619,721 A | 4/1997 | Maruko | |
| 5,630,028 A | 5/1997 | DeMeo | |
| 5,737,599 A | 4/1998 | Rowe et al. | |
| 5,748,975 A | 5/1998 | Van De Vanter | |
| 5,757,384 A | 5/1998 | Ikeda | |
| 5,761,395 A | 6/1998 | Miyazaki et al. | |
| 5,781,714 A | 7/1998 | Collins et al. | |
| 5,877,776 A | 3/1999 | Beaman et al. | |
| 5,926,189 A | 7/1999 | Beaman et al. | |
| 5,940,581 A | 8/1999 | Lipton | |
| 5,995,718 A | 11/1999 | Hiraike | |
| 6,012,071 A | 1/2000 | Krishna et al. | |
| 6,016,142 A | 1/2000 | Chang | |
| 6,031,549 A | 2/2000 | Hayes-Roth | |
| 6,044,205 A | 3/2000 | Reed et al. | |
| 6,065,008 A | 5/2000 | Simon et al. | |
| 6,073,147 A | 6/2000 | Chan et al. | |
| 6,111,654 A * | 8/2000 | Cartier | G06K 15/02 358/1.1 |
| 6,141,002 A | 10/2000 | Kanungo et al. | |
| 6,167,441 A | 12/2000 | Himmel | |
| 6,249,908 B1 | 6/2001 | Stamm | |
| 6,252,671 B1 | 6/2001 | Peng et al. | |
| 6,282,327 B1 | 8/2001 | Betrisey | |
| 6,313,920 B1 | 11/2001 | Dresevic et al. | |
| 6,320,587 B1 | 11/2001 | Funyu | |
| 6,323,864 B1 | 11/2001 | Kaul et al. | |
| 6,330,577 B1 | 12/2001 | Kim | |
| 6,343,301 B1 | 1/2002 | Halt et al. | |
| 6,426,751 B1 | 7/2002 | Patel | |
| 6,490,051 B1 | 12/2002 | Nguyen et al. | |
| 6,512,531 B1 | 1/2003 | Gartland | |
| 6,522,330 B2 | 2/2003 | Kobayashi | |
| 6,522,347 B1 | 2/2003 | Tsuji | |
| 6,583,789 B1 | 6/2003 | Carlson et al. | |
| 6,601,009 B2 | 7/2003 | Florschuetz | |
| 6,657,625 B1 | 12/2003 | Chik et al. | |
| 6,675,358 B1 | 1/2004 | Kido | |
| 6,678,688 B1 | 1/2004 | Unruh | |
| 6,687,879 B1 | 2/2004 | Teshima | |
| 6,704,116 B1 | 3/2004 | Abulhab | |
| 6,704,648 B1 | 3/2004 | Naik et al. | |
| 6,718,519 B1 | 4/2004 | Taieb | |
| 6,738,526 B1 | 5/2004 | Betrisey | |
| 6,754,875 B1 | 6/2004 | Paradies | |
| 6,760,029 B1 | 7/2004 | Phinney et al. | |
| 6,771,267 B1 | 8/2004 | Muller | |
| 6,810,504 B2 | 10/2004 | Cooper et al. | |
| 6,813,747 B1 | 11/2004 | Taieb | |
| 6,853,980 B1 | 2/2005 | Ying et al. | |
| 6,856,317 B2 | 2/2005 | Konsella et al. | |
| 6,882,344 B1 | 4/2005 | Hayes et al. | |
| 6,901,427 B2 | 5/2005 | Teshima | |
| 6,907,444 B2 | 6/2005 | Narasimhan et al. | |
| 6,952,210 B1 | 10/2005 | Renner et al. | |
| 6,992,671 B1 | 1/2006 | Corona | |
| 6,993,538 B2 | 1/2006 | Gray | |
| 7,050,079 B1 | 5/2006 | Estrada et al. | |
| 7,064,757 B1 | 6/2006 | Opstad et al. | |
| 7,064,758 B2 | 6/2006 | Chik et al. | |
| 7,155,672 B1 | 12/2006 | Adler et al. | |
| 7,184,046 B1 | 2/2007 | Hawkins | |
| 7,188,313 B2 | 3/2007 | Hughes et al. | |
| 7,228,501 B2 | 6/2007 | Brown et al. | |
| 7,231,602 B1 | 6/2007 | Truelove et al. | |
| 7,346,845 B2 | 3/2008 | Teshima et al. | |
| 7,373,140 B1 | 5/2008 | Matsumoto | |
| 7,477,988 B2 | 1/2009 | Dorum | |
| 7,492,365 B2 | 2/2009 | Corbin et al. | |
| 7,505,040 B2 | 3/2009 | Stamm et al. | |
| 7,539,939 B1 | 5/2009 | Schomer | |
| 7,552,008 B1 | 6/2009 | Newstrom et al. | |
| 7,580,038 B2 | 8/2009 | Chik et al. | |
| 7,583,397 B2 | 9/2009 | Smith | |
| 7,636,885 B2 | 12/2009 | Merz et al. | |
| 7,701,458 B2 | 4/2010 | Sahuc et al. | |
| 7,752,222 B1 | 7/2010 | Cierniak | |
| 7,768,513 B2 | 8/2010 | Klassen | |
| 7,836,094 B2 | 11/2010 | Ornstein et al. | |
| 7,882,432 B2 | 2/2011 | Nishikawa et al. | |
| 7,937,658 B1 | 5/2011 | Lunde | |
| 7,944,447 B2 | 5/2011 | Clegg et al. | |
| 7,958,448 B2 | 6/2011 | Fattic et al. | |
| 7,987,244 B1 | 7/2011 | Lewis et al. | |
| 8,098,250 B2 | 1/2012 | Clegg et al. | |
| 8,116,791 B2 | 2/2012 | Agiv | |
| 8,201,088 B2 | 6/2012 | Levantovsky et al. | |
| 8,201,093 B2 | 6/2012 | Tuli | |
| 8,306,356 B1 | 11/2012 | Bever | |
| 8,381,115 B2 | 2/2013 | Tranchant et al. | |
| 8,413,051 B2 | 4/2013 | Bacus et al. | |
| 8,464,318 B1 | 6/2013 | Hallak | |
| 8,601,374 B2 | 12/2013 | Parham | |
| 8,643,652 B2 | 2/2014 | Kaplan | |
| 8,644,810 B1 | 2/2014 | Boyle | |
| 8,643,542 B2 | 4/2014 | Kaplan | |
| 8,689,101 B2 | 4/2014 | Fux et al. | |
| 8,731,905 B1 | 5/2014 | Tsang | |
| 9,063,682 B1 | 6/2015 | Bradshaw | |
| 9,317,777 B2 | 4/2016 | Kaasila et al. | |
| 9,319,444 B2 | 4/2016 | Levantovsky | |
| 9,432,671 B2 | 8/2016 | Campanelli et al. | |
| 9,483,445 B1 | 11/2016 | Joshi et al. | |
| 9,569,865 B2 | 2/2017 | Kaasila et al. | |
| 9,626,337 B2 | 4/2017 | Kaasila et al. | |
| 9,691,169 B2 | 6/2017 | Kaasila et al. | |
| 2001/0021937 A1* | 9/2001 | Cicchitelli | G09G 5/00 715/269 |
| 2001/0052901 A1 | 12/2001 | Kawabata et al. | |
| 2002/0010725 A1 | 1/2002 | Mo | |
| 2002/0033824 A1 | 3/2002 | Stamm | |
| 2002/0052916 A1 | 5/2002 | Kloba et al. | |
| 2002/0057853 A1 | 5/2002 | Usami | |
| 2002/0059344 A1 | 5/2002 | Britton et al. | |
| 2002/0087702 A1 | 7/2002 | Mori | |
| 2002/0093506 A1 | 7/2002 | Hobson | |
| 2002/0120721 A1 | 8/2002 | Eilers et al. | |
| 2002/0174186 A1 | 11/2002 | Hashimoto et al. | |
| 2002/0194261 A1 | 12/2002 | Teshima | |
| 2003/0014545 A1 | 1/2003 | Broussard et al. | |
| 2003/0076350 A1 | 4/2003 | Vu | |
| 2003/0197698 A1 | 10/2003 | Perry et al. | |
| 2004/0025118 A1 | 2/2004 | Renner | |
| 2004/0088657 A1 | 5/2004 | Brown et al. | |
| 2004/0119714 A1 | 6/2004 | Everett et al. | |
| 2004/0177056 A1 | 9/2004 | Davis et al. | |
| 2004/0189643 A1 | 9/2004 | Frisken et al. | |
| 2004/0207627 A1 | 10/2004 | Konsella et al. | |
| 2004/0233198 A1 | 11/2004 | Kubo | |
| 2005/0015307 A1* | 1/2005 | Simpson | G06F 17/30241 705/26.61 |
| 2005/0033814 A1 | 2/2005 | Ota | |
| 2005/0094173 A1 | 5/2005 | Engelman et al. | |
| 2005/0111045 A1 | 5/2005 | Imai | |
| 2005/0128508 A1 | 6/2005 | Greef et al. | |
| 2005/0149942 A1 | 7/2005 | Venkatraman | |
| 2005/0190186 A1 | 9/2005 | Klassen | |
| 2005/0193336 A1 | 9/2005 | Fux et al. | |
| 2005/0200871 A1 | 9/2005 | Miyata | |
| 2005/0264570 A1 | 12/2005 | Stamm | |
| 2005/0270553 A1 | 12/2005 | Kawara | |
| 2005/0275656 A1 | 12/2005 | Corbin et al. | |
| 2006/0010371 A1 | 1/2006 | Shur et al. | |
| 2006/0017731 A1 | 1/2006 | Matskewich et al. | |

(56) References Cited

U.S. PATENT DOCUMENTS

| | | |
|---|---|---|
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |
| 2006/0168639 A1 | 7/2006 | Gan |
| 2006/0241861 A1 | 10/2006 | Takashima |
| 2006/0245727 A1 | 11/2006 | Nakano et al. |
| 2006/0253395 A1 | 11/2006 | Corbell |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0024626 A1 | 2/2007 | Kagle et al. |
| 2007/0050419 A1 | 3/2007 | Weyl et al. |
| 2007/0055931 A1 | 3/2007 | Zaima |
| 2007/0139412 A1 | 6/2007 | Stamm |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engleman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0115046 A1 | 5/2008 | Yamaguchi |
| 2008/0154911 A1 | 6/2008 | Cheng |
| 2008/0222734 A1 | 9/2008 | Redlich et al. |
| 2008/0282186 A1 | 11/2008 | Basavaraju |
| 2008/0303822 A1* | 12/2008 | Taylor .................. G06F 17/214 345/467 |
| 2008/0306916 A1 | 12/2008 | Gonzalez et al. |
| 2009/0031220 A1 | 1/2009 | Tranchant |
| 2009/0037492 A1 | 2/2009 | Baitalmal et al. |
| 2009/0037523 A1 | 2/2009 | Kolke et al. |
| 2009/0063964 A1 | 3/2009 | Huang |
| 2009/0070128 A1 | 3/2009 | McCauley et al. |
| 2009/0097049 A1 | 4/2009 | Cho |
| 2009/0100074 A1 | 4/2009 | Joung et al. |
| 2009/0119678 A1 | 5/2009 | Shih |
| 2009/0158134 A1 | 6/2009 | Wang |
| 2009/0183069 A1* | 7/2009 | Duggan ................ G06F 17/214 715/269 |
| 2009/0275351 A1 | 11/2009 | Jeung et al. |
| 2009/0287998 A1 | 11/2009 | Kalra |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0032074 A1 | 2/2011 | Novack et al. |
| 2011/0090229 A1 | 4/2011 | Bacus et al. |
| 2011/0090230 A1 | 4/2011 | Bacus et al. |
| 2011/0093565 A1* | 4/2011 | Bacus ................ G06F 17/30905 709/219 |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0203000 A1 | 8/2011 | Bacus et al. |
| 2011/0238495 A1 | 9/2011 | Kang |
| 2011/0258535 A1 | 10/2011 | Adler, III et al. |
| 2011/0271180 A1* | 11/2011 | Lee ...................... G06F 17/214 715/269 |
| 2011/0276872 A1 | 11/2011 | Kataria |
| 2011/0289407 A1* | 11/2011 | Naik .................... G06F 17/214 715/269 |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1* | 2/2012 | Perronnin .......... G06K 9/00879 382/159 |
| 2012/0066590 A1 | 3/2012 | Harris et al. |
| 2012/0072978 A1 | 3/2012 | DeLuca |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0134590 A1 | 5/2012 | Petrou |
| 2012/0215640 A1 | 8/2012 | Ramer et al. |
| 2012/0288190 A1 | 11/2012 | Tang |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud |
| 2013/0067319 A1* | 3/2013 | Olszewski ............ G06F 17/218 715/234 |
| 2013/0120396 A1 | 5/2013 | Kaplan |
| 2013/0127872 A1 | 5/2013 | Kaplan |
| 2013/0156302 A1* | 6/2013 | Rodriguez Serrano ...................... G06K 9/6297 382/159 |
| 2013/0163027 A1 | 6/2013 | Shustef |
| 2013/0179761 A1 | 7/2013 | Cho |
| 2013/0185028 A1 | 7/2013 | Sullivan |
| 2013/0215126 A1 | 8/2013 | Roberts |
| 2013/0215133 A1 | 8/2013 | Gould et al. |
| 2013/0321617 A1 | 12/2013 | Lehmann |
| 2013/0326348 A1 | 12/2013 | Ip et al. |
| 2014/0025756 A1 | 1/2014 | Kamens |
| 2014/0047329 A1 | 2/2014 | Levantovsky et al. |
| 2014/0052801 A1 | 2/2014 | Zuo et al. |
| 2014/0089348 A1 | 3/2014 | Vollmert |
| 2014/0136957 A1 | 5/2014 | Kaasila et al. |
| 2014/0153012 A1 | 6/2014 | Seguin |
| 2014/0176563 A1 | 6/2014 | Kaasila et al. |
| 2014/0195903 A1 | 7/2014 | Kaasila et al. |
| 2014/0282055 A1 | 9/2014 | Engel et al. |
| 2014/0358802 A1 | 12/2014 | Biswas |
| 2015/0020212 A1 | 1/2015 | Demaree |
| 2015/0030238 A1* | 1/2015 | Yang .................... G06K 9/627 382/159 |
| 2015/0062140 A1 | 3/2015 | Levantovsky et al. |
| 2015/0074522 A1 | 3/2015 | Harned, III et al. |
| 2015/0097842 A1 | 4/2015 | Kaasila et al. |
| 2015/0100882 A1* | 4/2015 | Severenuk ............ G06F 17/214 715/269 |
| 2015/0154002 A1 | 6/2015 | Weinstein et al. |
| 2015/0178476 A1 | 6/2015 | Horton |
| 2015/0193386 A1 | 7/2015 | Wurtz |
| 2015/0220494 A1 | 8/2015 | Qin et al. |
| 2015/0278167 A1* | 10/2015 | Arnold ................ G06F 17/2211 382/155 |
| 2015/0339273 A1* | 11/2015 | Yang .................... G06F 17/214 707/723 |
| 2015/0339276 A1 | 11/2015 | Bloem et al. |
| 2015/0339543 A1* | 11/2015 | Campanelli ............ G06K 9/18 382/182 |
| 2015/0348297 A1 | 12/2015 | Kaasila et al. |
| 2015/0378297 A1 | 12/2015 | Kaasila et al. |
| 2016/0078656 A1 | 3/2016 | Borson et al. |
| 2016/0092439 A1 | 3/2016 | Ichimi |
| 2016/0140952 A1 | 5/2016 | Graham |
| 2016/0170940 A1 | 6/2016 | Levantovsky |
| 2016/0171343 A1 | 6/2016 | Kaasila et al. |
| 2016/0182606 A1 | 6/2016 | Kaasila et al. |
| 2016/0246762 A1 | 8/2016 | Eaton |
| 2016/0307156 A1 | 10/2016 | Burner |
| 2016/0314377 A1 | 10/2016 | Vieira et al. |
| 2016/0321217 A1 | 11/2016 | Ikemoto et al. |
| 2016/0371232 A1 | 12/2016 | Ellis et al. |
| 2017/0017778 A1 | 1/2017 | Ford et al. |

(56) References Cited

U.S. PATENT DOCUMENTS

| | | |
|---|---|---|
| 2017/0237723 A1 | 8/2017 | Gupta et al. |
| 2018/0039605 A1 | 2/2018 | Pao et al. |
| 2018/0075455 A1 | 3/2018 | Kumnick et al. |
| 2018/0082156 A1 | 3/2018 | Jin et al. |

FOREIGN PATENT DOCUMENTS

| | | |
|---|---|---|
| EP | 2857983 | 4/2015 |
| JP | 06-258982 | 9/1994 |
| JP | 10-124030 | 5/1998 |
| JP | 2002-507289 | 3/2002 |
| JP | 2003-288184 | 10/2003 |
| JP | 05-215915 | 8/2005 |
| JP | 05-217816 | 8/2005 |
| JP | 07-011733 | 1/2007 |
| JP | 2009-545064 | 12/2009 |
| JP | 5140997 | 11/2012 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 04/012099 | 2/2004 |
| WO | WO 05/001675 | 1/2005 |
| WO | WO 2008/013720 | 1/2008 |

OTHER PUBLICATIONS

Font Pair, "Font Pair", URL: http://web.archive.org/web/20150120231122/http://fontpair.co/, Jan. 20, 2015.*
George Margulis, "Optical Character Recognition: Classification of Handwritten Digits and Computer Fonts", Aug. 1, 2014, URL: https://web.archive.org/web/20140801114017/http://cs229.stanford.edu/proj2011/Margulis-OpticalCharacterRecognition.pdf.*
European Search Report, 14187549.2, dated Jul. 30, 2015 7 pages.
Saurabh, Kataria et al., "Font retrieval on a large scale: An experimental study", 2010 17th IEEE International Conference on Image Processing (ICIP 2010); Sep. 26-29, 2010; Hong Kong, China, IEEE, Piscataway, NJ, USA, Sep. 26, 2010, pp. 2177-2180.
"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
Adobe Systems Incorporated, "The Type 42 Font Format Specification," Technical Note #5012, Jul. 31, 1998, pp. 1-24.
Adobe Systems Incorporated, "PostScript Language Reference—Third Edition," Feb. 1999, pp. 313-390.
Adobe Systems Incorporated, "To Unicode Mapping File Tutorial," Adobe Technical Note, XP002348387, May 2003.
"Announcing Speakeasy: A new open-source language tool from Typekit," Oct. 28, 2010, on-line http://blog.typekit.com/2010/10/28/announcing-speakeasy-a-new-open-source-language-tool-from-typekit/.
Apple Computers, "The True Type Font File," Oct. 27, 2000, pp. 1-17.
Celik et al., "W3C, CSS3 Module: Fonts," W3C Working Draft, Jul. 31, 2001, pp. 1-30.
"Colorfont/v1," Feb. 28, 2011, retrieved from the internet: http://manufacturaindependente.com/colorfont/v1/.
Doughty, Mike, "Using OpenType® Fonts with Adobe® InDesign®," Jun. 11, 2012 retrieved from the internet: http://web.archive.org/web/20121223032924/http://www.sketchpad.ne/opentype-indesign.htm (retrieved Sep. 22, 2014), 2 pages.
Extensis, Suitcase 10.2, Quick Start Guide for Macintosh, 2001, 23 pgs.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Search Report & Written Opinion issued in PCT application No. PCT/US10/01272, dated Jun. 15, 2010, 6 pages.
International Search Report & Written Opinion issued in PCT application No. PCT/US2011/034050 dated Jul. 15, 2011, 13 pages.
International Search Report & Written Opinion, PCT/US2013/026051, dated Jun. 5, 2013, 9 pages.
International Search Report & Written Opinion, PCT/US2013/071519, dated Mar. 5, 2014, 12 pages.
International Search Report & Written Opinion, PCT/US2013/076917, dated Jul. 9, 2014, 11 pages.
International Search Report & Written Opinion, PCT/US2014/010786, dated Sep. 30, 2014, 9 pages.
Japanese Office Action, 2009-521768, dated Aug. 28, 2012.
Japanese Office Action, 2013-508184, dated Apr. 1, 2015.
Open Text Exceed, User's Guide, Version 14, Nov. 2009, 372 pgs.
"photofont.com—Use photofonts," Sep. 2, 2012, retrieved from the internet: http://web.archive.org/web/20120902021143/http://photofont.com/photofont/use/web.
Supplementary European Search Report, European Patent Office, European patent application No. EP 07796924, dated Dec. 27, 2010, 8 pages.
TrueType Fundamentals, Microsoft Typography, Nov. 1997, pp. 1-17.
Universal Type Server, Upgrading from Suitcase Server, Sep. 29, 2009, 18 pgs.
Wenzel, Martin, "An Introduction to OpenType Substitution Features," Dec. 26, 2012, Retrieved from the internet: http://web.archive.org/web/20121226233317/http://ilovetypogaphy.com/OpenType/opentype-features. Html (retrieved on Sep. 18, 2014), 12 pages.
European Search Report, 14184499.3, dated Jul. 13, 2015, 7 pages.
"Flash CS4 Professional ActionScript 2.0", 2007, retrieved on http://help.adobe.com/en_US/AS2LCR/Flash_10.0/help.html?content-00000284.html on Aug. 31, 2015.
European Search Report, 13179728.4, dated Sep. 10, 2015, 3 pages.
Ma Wei-Ying et al., "Framework for adaptive content delivery in heterogeneous network environments", Jan. 24, 2000, Retrieved from the Internet: http://www.cooltown.hp.com/papers/adcon/MMCN2000.
International Preliminary Report on Patentability issued in PCT application No. PCT/US2013/071519 dated Jun. 9, 2015, 9 pages.
"Saffron Type System", retrieved from the internet Nov. 12, 2014, 7 pages.
International Search Report & Written Opinion, PCT/US2016/023282, dated Oct. 7, 2016, 16 pages.
Forums.macrumors.com' [online]. "which one is the main FONTS folder ?" May 19, 2006, [retrieved on Jun. 19, 2017]. Retrieved from the Internet: URL<https://forums.macrumors.com/threads/which-one-is-the-main-fontsfolder.202284/>, 7 pages.
International Preliminary Report on Patentability issued in PCT application No. PCT/US2015/066145 dated Jun. 20, 2017, 7 pages.
International Preliminary Report on Patentability issued in PCT application No. PCT/US2016/023282, dated Oct. 26, 2017, 9 pages.
Written Opposition to the grant of Japanese Patent No. 6097214 by Masatake Fujii, dated Sep. 12, 2017, 97 pages, with partial English translation.

\* cited by examiner

ITALIAN OLD STYLE  400 hamburgefonstiv
hamburgefonstiv
hamburgefonstiv
hamburgefonstiv
hamburgefonstiv
hamburgefonstiv

Types which have the characteristics of those developed during the Italian Renaissance. Attributes may include:
- slanted crossbar on e
- low contrast of thick/thin
- concave serif shape
- wedge serifs on ascenders
- extreme angled stress on round shapes High Level Pairing with:
1. Humanist Lower Level Pairing with:
1. Contemporary Humanist

FRENCH OLD STYLE  402 hamburgefonstiv
hamburgefonstiv
hamburgefonstiv
hamburgefonstiv
hamburgefonstiv
hamburgefonstiv
hamburgefonstiv
hamburgefonstiv

Types which have the characteristics of those developed in France after the Italian Renaissance. Attributes may include:
- flat crossbar on e
- increased thick/thin contrast
- thin bracketed serifs
- concave serif shape
- wedge serifs on ascenders
- some angled stress on round shapes
- small counters on a and e High Level Pairing with:
1. Humanist
2. Contemporary Humanist

FIG. 4

DUTCH OLD STYLE
500 hamburgefonstiv
hamburgefonstiv
hamburgefonstiv
hamburgefonstiv

Types which have the characteristics of those developed in England & Holland after the Italian Renaissance. Attributes may include:
• flat, slightly bracketed serifs
• increased thick/thin contrast
• nearly vertical stress on round shapes
• wedged serifs on ascenders High Level Pairing with:
1. Humanist
2. Contemporary Humanist Lower Level Pairing with:
1. Grotesque

TRANSITIONAL
502 hamburgefonstiv
hamburgefonstiv
hamburgefonstiv
hamburgefonstiv
hamburgefonstiv
hamburgefonstiv
hamburgefonstiv
hamburgefonstiv Types that have the characteristics which bridge the gap between Old Style and Modern. Attributes may include:
• flat, thin and bracketed serifs
• increased thick/thin contrast
• mostly vertical stress on round shapes
• nearly flat serifs on ascenders High Level Pairing with:
1. Grotesque
2. Contemporary Humanist Lower Level Pairing with:
1. Humanist

FIG. 5

MODERN 600 hamburgefonstiv _Didot_
hamburgefonstiv _Bauer Bodoni_
hamburgefonstiv _ITC Bodoni_

Types having the characteristics of those developed by
Bodoni and his contemporaries. Attributes may include:
• flat, thin un-bracketed serifs
• extreme thick/thin contrast
• extreme vertical stress on round shapes
• mostly flat serifs on ascenders High Level Pairing with:
1. Contemporary Humanist
2. Grotesque

CLARENDON SERIF 602 hamburgefonstiv _Century Schoolbook_
hamburgefonstiv _Clarendon_
hamburgefonstiv _Century Old Style_
hamburgefonstiv _ITC Cheltenham_
hamburgefonstiv _Cushing_

Having the characteristics of types developed for legibility or
for newspapers. Attributes may include:
• thick bracketed serifs
• relatively low thick/thin contrast
• extreme vertical stress on round shapes
• mostly flat serifs on ascenders
• large x-height High Level Pairing with:
1. Grotesque
2. Contemporary Humanist Lower Level Pairing with:
1. Geometric

FIG. 6

SLAB SERIF hamburgefonstiv (FFC Clarendon)
hamburgefonstiv (Rockwell)
hamburgefonstiv (Courier)
hamburgefonstiv (Chaparral)
hamburgefonstiv (Museo)

Having the characteristics of types with unbracketed serifs. Attributes may include:
• thick serifs with no transition or 'bracket'.
• relatively low thick/thin contrast
• extreme vertical stress on round shapes
• mostly flat serifs on ascenders
• large x-height High Level Pairing with:
1. Contemporary Humanist
2. Grotesque
3. Geometric

GEOMETRIC 900
Types which are deconstructed to their simplest
geometric forms. Attributes include:
• adherence to geometric shapes
• little or no modulation in stroke weight hamburgerfonstiv
hamburgerfonstiv
hamburgerfonstiv
hamburgerfonstiv GROTESQUE 902
Types designed with a sense of industrial utility.
Attributes include:
• little or no modulation in stroke weight
• terminals tend to be long and nearly close off counters
• little variation in horizontal proportion
• large x-height
• square dots and punctuation hamburgerfonstiv
hamburgerfonstiv
hamburgerfonstiv
hamburgerfonstiv
hamburgerfonstiv
hamburgerfonstiv

FIG. 9

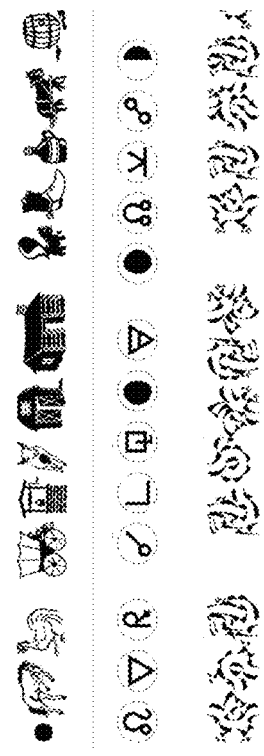
FIG. 10

PAIRING FONTS FOR PRESENTATION

BACKGROUND

This description relates to identifying font pairings for being presented together (e.g., one font used for a document title and another font for the body of the document). Once paired the fonts can be presented together for review and selection.

The astronomical growth of available textual content on the Internet has lead users to demand more variety to express this content. Similar to the variety of products provided by physical and online stores; content authors, publishers and viewers have grown to expect a wide assortment of content viewing formats, such as different fonts to view text-based assets. However, this explosion of content and potential presentation formats can become overwhelming and easily saturate the casual viewer. Faced with such an overabundance of information, decision-making abilities can be inhibited and the visual experience of a viewer degraded.

SUMMARY

The systems and techniques described can aid online viewers by improving their ability to select fonts by pairing particular fonts that are aesthetically pleasing. Multiple numerical representations of features can be used to represent each different font and various techniques can be used to characterize the fonts from these features. Once characterized, the fonts can be paired based upon a number of predefined rules associated with the font characterizations. Once paired, the fonts can be presented in a manner that allows an online viewer (e.g., shopper) to quickly see not only the two fonts but also how well the pair of fonts complement each other (e.g., similar to pairing a wine with a particular meal). Furthermore, presenting such font pairs, a viewer can quickly review the many pairings, with minimal delay. By improving their ability to navigate among vast numbers of fonts and how they relate to each other, viewer may become interested in more fonts than originally sought, and increase the number of fonts to be licensed from a provider.

In one aspect, a computing device implemented method includes attaining data representing features of a font capable of representing one or more glyphs. The method also includes determining a rating for pairing the font and at least one other font using machine learning, the features of the font, and one or more rules included in a set of rules.

Implementations may include one or more of the following features. The method may further include identifying at least one category representative for the font of the received features using the machine learning, wherein the at least one category is included in a set of categories. The method may further include initiating presentation of the pairing of the font and the at least one other font. The categories may be predefined. The machine learning may use a deep learning technique. At least one category may not pairable with another of the categories. The features may be derived based upon separating two or more categories, derived in an automatic manner, etc. A portion of the features may be derived in an automatic manner and a portion of the features may be derived based upon separating two or more categories. The set of rules may be predefined. The set of rules may be derived an automatic manner. The features may be attained from one or more bitmaps of one or more characters of the font. The features may be attained from one or more outlines of one or more characters of the font. Initiating presentation of the pairing of the font and the at least one other font may include prioritizing the pairing for presentation based upon customer interest. Initiating presentation of the pairing of the font and the at least one other font may include prioritizing the pairing for presentation based upon a stochastic process. Customer interest may include transaction information of the pairing of the font and the at least one other font. The features of the font may be employed to determine font similarity.

In another aspect, a system includes a computing device that includes a memory configured to store instructions. The system also includes a processor to execute the instructions to perform operations that include attaining data representing features of a font capable of representing one or more glyphs. Operations also include determining a rating for pairing the font and at least one other font using machine learning, the features of the font, and one or more rules included in a set of rules.

Implementations may include one or more of the following features. Operations may further include identifying at least one category representative for the font of the received features using the machine learning, wherein the at least one category is included in a set of categories. Operations may further include initiating presentation of the pairing of the font and the at least one other font. The categories may be predefined. The machine learning may use a deep learning technique. At least one category may not pairable with another of the categories. The features may be derived based upon separating two or more categories, derived in an automatic manner, etc. A portion of the features may be derived in an automatic manner and a portion of the features may be derived based upon separating two or more categories. The set of rules may be predefined. The set of rules may be derived an automatic manner. The features may be attained from one or more bitmaps of one or more characters of the font. The features may be attained from one or more outlines of one or more characters of the font. Initiating presentation of the pairing of the font and the at least one other font may include prioritizing the pairing for presentation based upon customer interest. Initiating presentation of the pairing of the font and the at least one other font may include prioritizing the pairing for presentation based upon a stochastic process. Customer interest may include transaction information of the pairing of the font and the at least one other font. The features of the font may be employed to determine font similarity.

In another aspect, one or more computer readable media storing instructions that are executable by a processing device, and upon such execution cause the processing device to perform operations that include attaining data representing features of a font capable of representing one or more glyphs. Operations also include determining a rating for pairing the font and at least one other font using machine learning, the features of the font, and one or more rules included in a set of rules.

Implementations may include one or more of the following features. Operations may further include identifying at least one category representative for the font of the received features using the machine learning, wherein the at least one category is included in a set of categories. Operations may further include initiating presentation of the pairing of the font and the at least one other font. The categories may be predefined. The machine learning may use a deep learning technique. At least one category may not pairable with another of the categories. The features may be derived based upon separating two or more categories, derived in an automatic manner, etc. A portion of the features may be derived in an automatic manner and a portion of the features may be derived based upon separating two or more categories. The set of rules may be predefined. The set of rules may be derived an automatic manner. The features may be attained from one or more bitmaps of one or more characters of the font. The features may be attained from one or more outlines of one or more characters of the font. Initiating presentation of the pairing of the font and the at least one other font may include prioritizing the pairing for presentation based upon customer interest. Initiating presentation of the pairing of the font and the at least one other font may include prioritizing the pairing for presentation based upon a stochastic process. Customer interest may include transaction information of the pairing of the font and the at least one other font. The features of the font may be employed to determine font similarity.

These and other aspects, features, and various combinations may be expressed as methods, apparatus, systems, means for performing functions, program products, etc.

Other features and advantages will be apparent from the description and the claims.

DESCRIPTION OF DRAWINGS

FIGS. 4-10 illustrate different font categories.

DETAILED DESCRIPTION

Figure 1:
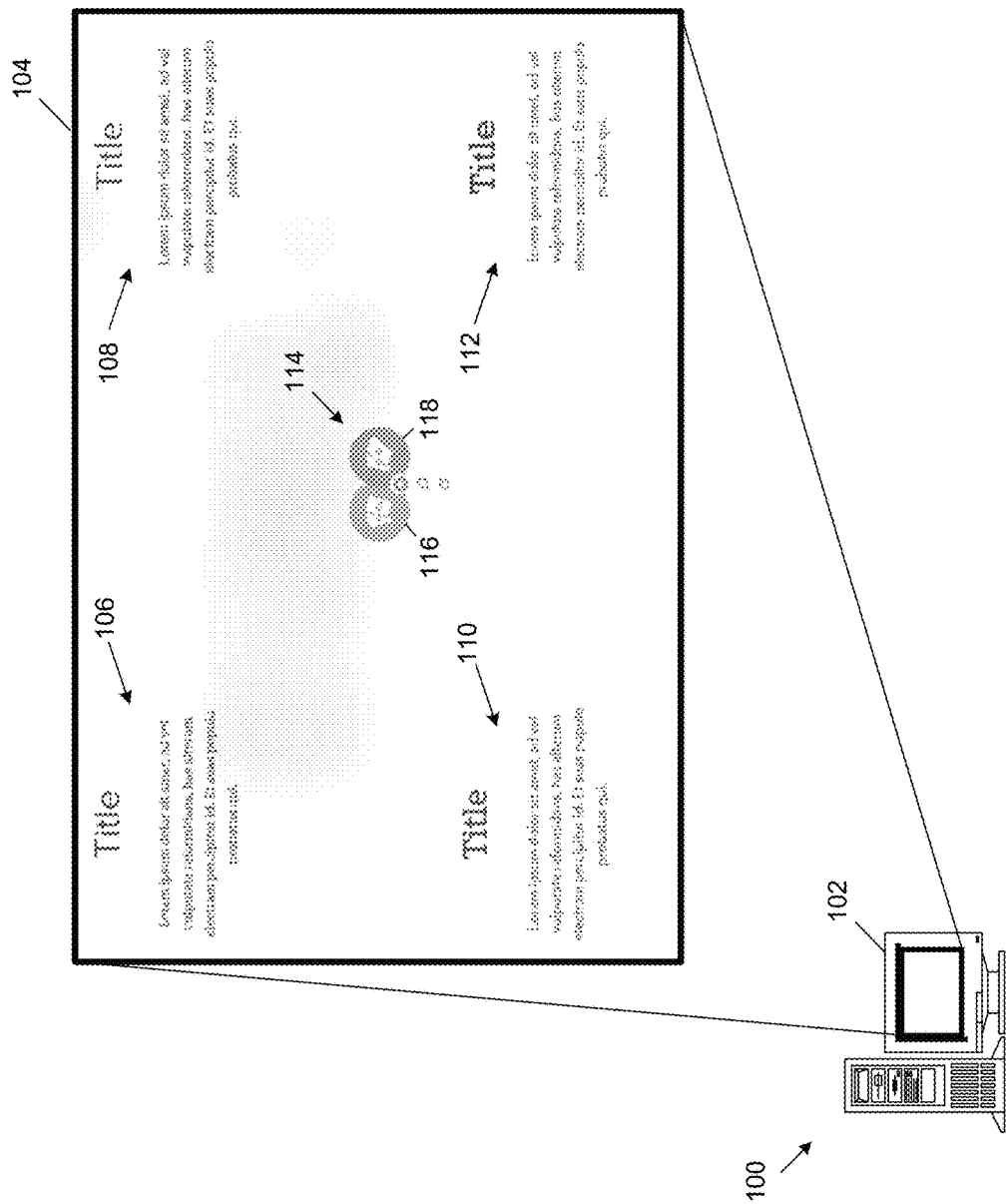
FIG. 1 illustrates a computer interface used to present and select pairs of fonts.

Referring to FIG. 1, a computing device (e.g., computer system 100) includes a display 102 that allows a user to create various types of content, such as text, via one or more applications. However, with an ever-increasing number of fonts at a user's disposal, selecting appropriate fonts for the project at hand could be an extremely time-consuming task. To reduce such a potential time sink, one or more techniques may be implemented to present pairings of fonts in which each of the individual fonts complements the other in the pair to produce aesthetically pleasing assets (e.g., an electronic document, web page, web site, etc.).

In the illustrated example, an interface 104 is presented (e.g., via a website) to present potential font pairs for selection. In this example, sample text is used to present the possible selections, however, in other arrangements user-selected text (e.g., selected from an electronic document being created) may be used for presenting the selectable font pairs. In this illustration, four font pairs 106, 108, 110, 112 are shown in which one font presents a sample title and a second font presents a sample body of text. In general, each font pairing contains two different fonts that have been paired based upon the features of the individual fonts such that the two fonts complement each other. To present different sets of font pairings, a graphical selector 114 is presented in the interface 104. In this example, one icon 116 may be selected to present characters with substantially upright typeface while a second icon 118 may be selected to present characters in a sloping typeface (e.g., presented in italic). In this arrangement, one or more of the presented pairings 106, 108, 110, 112 may be selected to remain on the display (e.g., pairs 106 and 108 are selected to remain) while the other pairs will cycle (e.g., pairs 110 and 112 change) when the user interacts with the graphical selector 114. By providing such a continuum of font pairings, a user can relatively easily identify and select which pair is more desirable for a current project.

Various techniques may be employed to initiate such a presentation, for example, an initial font may be selected by the user and appropriate pairings may be presented based upon this initial selection. In another arrangement, the user may select multiple fonts and pairs may be presented that include pairs of the selected font and other font pairs deemed appropriate but not selected by the user. For such selections, various techniques may also be implemented; for example, the user may be directed to another menu, screen, etc. to select one or more initial fonts. Selecting initial fonts may employ the use one or more applications, functions, software modules, etc. For example, by highlighting textual content being presented by an application (executed on a computing device), a font may be selected. For instance, using a pointing device (e.g., a mouse) a user can define a bounding box to encircle text (e.g., a letter, word, phrase, etc.) being presented (e.g., in a website being shown by a web browser application). Once highlighted, the text may be provided to a software module (that may execute in concert with the web browser or independently) and font information may be extracted from the selected text (e.g., a bitmap, glyph outline, etc.). Such a technique allows a computer user to casually notice one or more fonts of interest (at any time) and simply select a sample of the font to determine font pairs and potentially be presented samples of such pairings.

Similar to presenting different types of fonts, an interface may also allow a user to navigate among other types of text representations. For example, fonts associated with different languages may be presented to allow user selection. Also, rather than presenting such font pairings in the presented interface, other types of presentation techniques may be employed.

Figure 2:
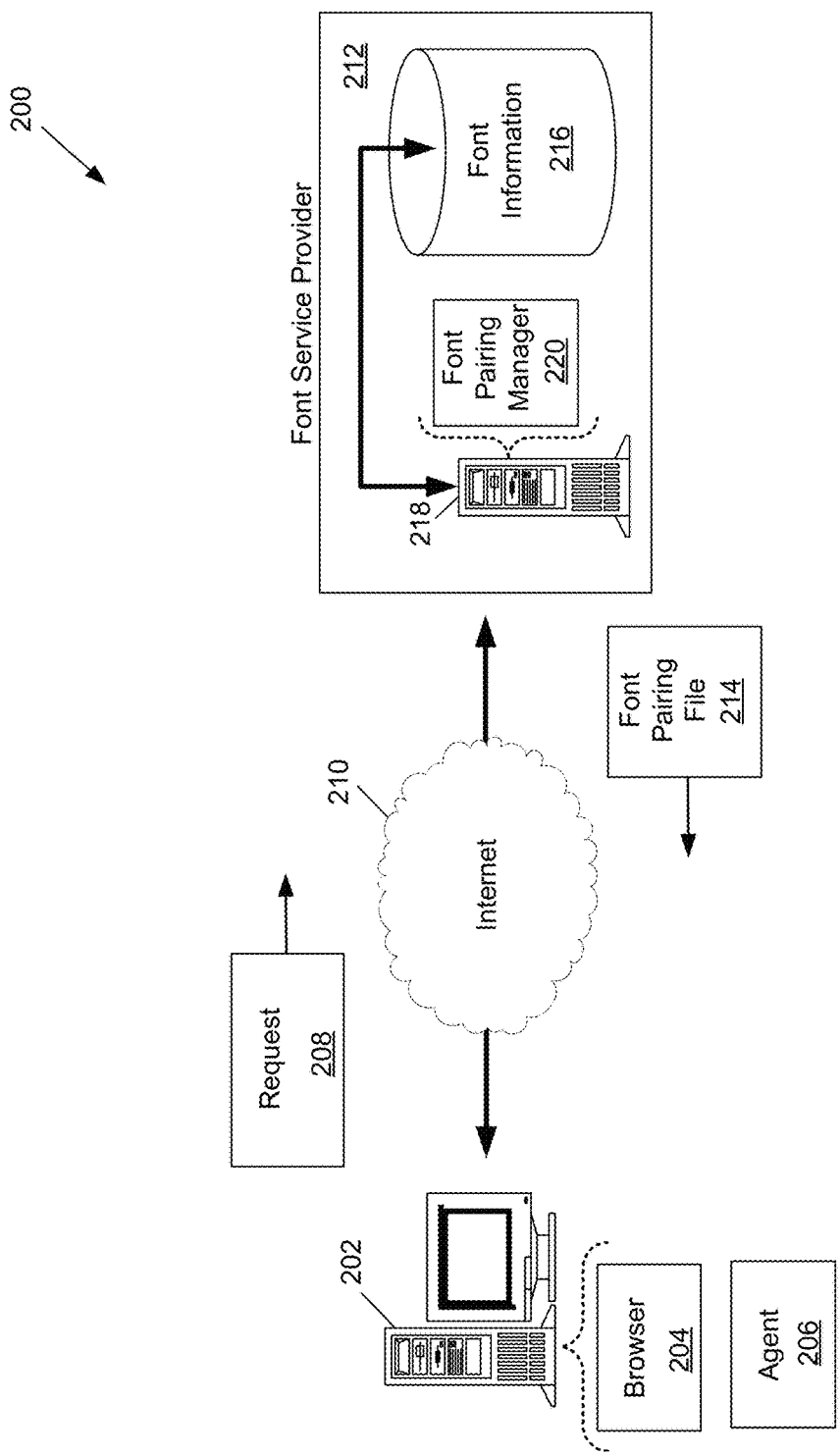
FIG. 2 is a block diagram of an Internet based computer network that provides font pair information.

Referring to FIG. 2, a computing environment 200 is presented that includes a computer system 202 that a user may interact with (using a keyboard, a pointing device, etc.) to select one or more font pairings (e.g., by interacting with the interface 104). Additionally, the computer system 202 may execute one or more applications (e.g., a browser 204) for attaining font information (e.g., exchange information with the interface 104, etc.). New font pairings, which are frequently being developed (e.g., through the introduction of one or more new fonts), and current font pairings, which may be adjusted and updated (e.g., one font in a pair may change), may become available for potential selection and use on the computer system 202. To deliver this font pairing information to the computer system 202 for presentation and possibly selection (e.g., for use in an executed application such as a word processor), one more techniques may be employed.

Prior to attaining one or more font pairs of interest to a user (e.g., noticed on the interface 104), information may be checked locally that the user's computer system. Various types of executable objects may be used for attaining the appropriate font and font pairing information, which may operate in concert with the browser 204. For example, the computer system 202 may execute a software agent 206 to collect font information such as the particular fonts that are present at the computer system 202. If one or more fonts or font pairings of interest to the user are currently reside at the computer system 202, the agent 206 may take action to assure that the fonts or font pairings are not repeatedly downloaded. The software agent 206 may also perform other operations such as monitoring interactions between the interface 104 and users, for example, the agent may track transactions executed by users (e.g., collect information representing font pairing selections, downloads, etc.). Software agents such as the agent 206 can be considered a software module that is executable in a substantially autonomous manner. For example, upon being provided access to the computer system 202, a software agent may operate without considerable user interaction. By operating in a somewhat flexible manner, the software agent can adaptively address font information needs. The software agent 206 may operate in a somewhat persistent manner to assist operations of selecting, monitoring and using font pairs. For example, the software agent 206 may execute in a substantially continuous manner.

In the presented environment 200, one or more interfaces for selecting font pairs may be provided (to the computer system 202) over one or more networks (e.g., the Internet 210) from a font service provider 212. For example, a website associated with the font service provider 212 may be accessed (by the computer system 202) to presenting selectable font pairs. Provided this information, a user can navigate among different pairs and peruse the individual fonts of the pairings. Upon one or more pair selections being made (and local fonts and font pairs checked), a request 208 is sent over the Internet 210 to the font service provider 212 for processing (e.g., check the potential transaction, identify requested data, and provide the requested font pairings). Once the needed information is produced, one or more techniques may be implemented to provide it to the computer system 202. For example, one or more files, such as a font pairing file 214, may be produced by the font service provider 212 and sent to the computer system 202. In some arrangements, the font service provider 212 may also provide the software agents to the computing devices in order to perform operations, such as monitoring the current font assets at the respective device. Agents delivered by the font service provider 212 may also provide other functions; for example, the agents may direct the deletion of provided fonts, font pairs, etc. based on one or more conditions (e.g., expired license term, expired period of time, etc.).

To provide the appropriate font pairing information to the computer system 202 (e.g., via the software agent 206), the font service provider 212 typically needs access to one or more libraries of fonts, font pairs, font information, etc. that may be stored locally or remotely. For example, font/font pair libraries and libraries of font information may be stored in a storage device 216 (e.g., one or more hard drives, CD-ROMs, etc.) on site. Being accessible by a server 218, the libraries may be used, along with information provided from software agents, to attain the appropriate font pairs. Illustrated as being stored in a single storage device 216, the font service provider 212 may also use numerous storage techniques and devices to retain collections of fonts, font pairs, and related font information (e.g., for different font styles, languages, etc.). Lists of font pairs, individual fonts, related information, etc. can also be stored (e.g., on the storage device 216) for later retrieval and use. The font service provider 212 may also access font information at separate locations as needed. For example, along with providing font pairs to the computer system 202, the server 218 may be used to collect information (e.g., font pairs, fonts, etc.) from one or more sources external to the font service provider 212 (e.g., via the Internet 210).

Along with providing needed font information, the font service provider 212 may contribute other functions. For example, font pairings may be prepared in advance by the font service provider 212 for future use. For example, as new fonts are developed, the font service provider 212 may determine appropriate pairings for the new fonts, which may include pairing among the new fonts and/or pairing with previously created fonts. To provide this functionally, the server 218 executes a font pairing manager 220, which, in general, determines appropriate pairings among fonts. The manager 220 may also perform other operations for providing pairing information, e.g., manage the flow of received requests and the delivery of requested font pairs. The font service manager 220 also manages font pairings; for example, a database (or other technique for structuring and storing data) is stored at the font service provider 212 (e.g., on the storage device 216) and includes records that represent the pairings. Other types of information may be stored at the font service provider 212, for example, transaction information provided by software agents (e.g., licensed font pairings), popularity of fonts, font pairings, etc. In some instances, tracking, monitoring, etc. operations may be performed; for example, records may be stored that reflect particular fonts, font pairings, etc. that have been requested from and provided to an individual computing device, type of computing device, etc.

Figure 3:
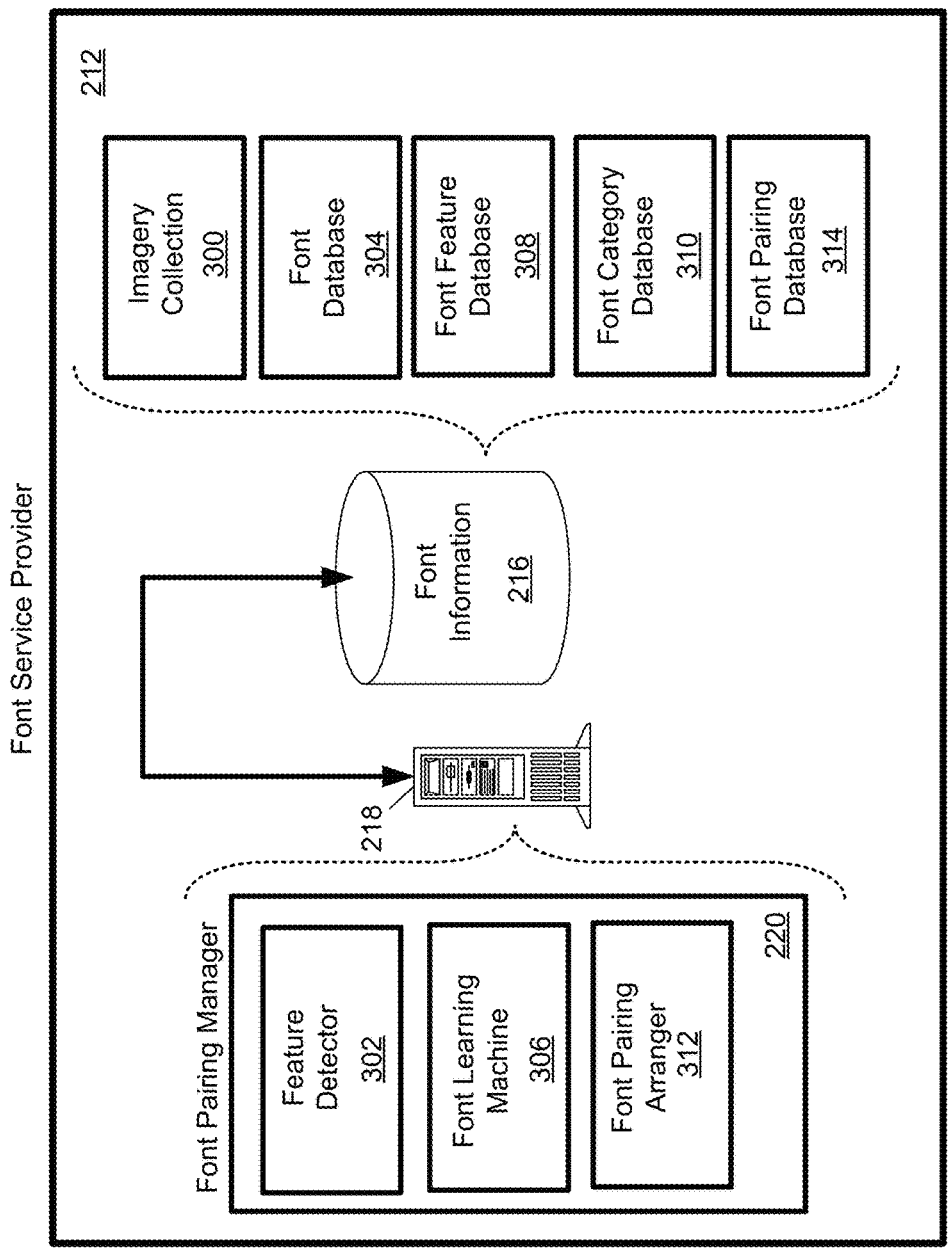
FIG. 3 is a block diagram of a font service provider that manages font pair information.
Figure 8:

Referring to FIG. 3, one or more techniques may be implemented to determine font pairings. For example, imagery of glyphs, characters, etc. associated with fonts may be collected, received, etc. and features of the fonts can be identified and used to determine the pairings. Such imagery can be provided in a number of manners; for example, the individual visual bits that represent a glyph, character, etc. (referred to as a bitmap) may be used to convey the shapes, sizes, etc. that are common to the characters of a particular font. In another example, the outlines of font characters may be employed to convey the typeface and style of a particular font. As illustrated in the figure, an imagery collection 300 such as a collection of bitmaps, outlines, etc. for a number of fonts can be attained by the font service provider 212 and placed in the storage device 216. In some arrangements, imagery data may be provided by one or more users of the services of the font service provider 212 (e.g., font bitmaps are provided by a user to identify one or more fonts for pairing). Along with the imagery collection 300, the storage device 216 (or other storage devices at the font service provider 212) may contain a font database 304 that includes information about numerous previously developed fonts, newly introduced fonts, fonts under development, etc. Similar to the imagery collection 300 being a source for determining font pairings, data stored in the font database 304 may be retrieved and used for determining font pairings. For example, the font database 304 may include data that represents various types of font families (e.g., Times New Roman, Arial, etc.) that typically include a set of fonts (e.g., regular, italic, bold, bold italic, etc.). Data for each font may represent a set of individual character shapes (glyphs). Such glyphs generally share various design features (e.g., geometry, stroke thickness, serifs, size, etc.) associated with the font. One or more techniques may be utilized for representing such fonts; for example, outline-based representations may be adopted in which lines and curves are used to define the borders of glyphs. Along with differences based on design features, fonts may differ based on functional aspects, such as the languages (e.g., English, Chinese, Latin, etc.) for which the fonts are used. Fonts may be scalable for a variety of sizes (e.g., for presentation by various imaging devices)

and may be represented in one or more formats. For example, scalable outline fonts may be represented in a format that includes data structures capable of supporting a variety of typographic visual symbols of many languages.

To initiate the process to identify pairings, imagery of a font (e.g., bitmaps of one or more font characters) can be used to identify particular features that individually or in combination uniquely describe each font. The identified features can then be used to define the font as being a member of one category from a set of predefined categories. Once categorized, a set of rules (e.g., predefined rules) can be employed to identify one or more categorizes whose font members would be appropriate for pairing with the font. Upon being paired, data representing the font pairings can be provided for presentation (e.g., to a client computing device), stored for later retrieval and use, etc.

As shown in the figure, the font pairing manager 220 (which includes a number of modules) is executed by the server 218 present at the font service provider 212. In this arrangement, the font pairing manager 220 includes a feature detector 302 that determines the features of each input font (e.g., retrieved from the imagery collection 300, the font database 304, etc.). In some arrangements, the feature detector 302 may calculate numerical representations of font features (e.g., in vector form) from the representations of the font such as bitmap images, outlines, etc. of font glyphs, characters, etc. In some arrangements, the features are size invariant such that feature values are substantially equivalent for different font sizes (e.g., features for a 50-point bitmap are equivalent to a 100-point bitmap). To calculate the features, one or more techniques may be implemented; for example, a bounding box may be produced to define a boundary for isolating a font glyph, a font character, a word produced from font characters, etc. (e.g., to attain a measure of height, width, etc.).

Once the features are determined, one or more techniques can be used for categorize the font that provided the features. For example, one or more forms of artificial intelligence, such as machine learning, can be employed such that a computing process or device may learn to categorize the font from the features of the font. To provide this functionality, machine learning may employ techniques such as regression to estimate font similarities. Upon being trained, a learning machine may be capable of outputting one or more numerical values that represents one or more categories to which the font should be considered a member. Input to the trained learning machine may take one or more forms. In one arrangement, representations of the font itself may be provided to the trained learning machine (e.g., bitmaps of font characters). Numerical representations of the font may also be used as input to the learning machine. For example, particular features that uniquely describe each font may be provided to allow the learning machine to output a series of number values that represent which category or categories the font should be considered a member. For example, each output values may range 0-1.0 in which low values (e.g., 0.2) represent that the font should not be a member of the respective categories and higher values (e.g., 0.8, 1.0) represent that the membership should be granted. One or more files may also be used for providing font information from which font features may be produced. For example, a file including outline information of a font (e.g., an OpenType font file or ".otf" file) may be input into a machine learning system and used to produce font features (from the font outlines). In some arrangements, the input file (or files) may be used by a renderer included in the machine learning system to produce an image (e.g., one or more bitmap images) to be used for feature determination.

To implement such an environment, one or more machine learning techniques may be employed. For example, supervised learning techniques may be implemented in which training is based on a desired output that is known for an input. Supervised learning can be considered an attempt to map inputs to outputs and then estimate outputs for previously unseen inputs (a newly introduced input). Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

In some arrangements, neural network techniques may be implemented using the font data (e.g., vectors of numerical values that represent features of the fonts) to invoke training algorithms for automatically learning the fonts and related information. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to training data. By using the font data (e.g., font feature vectors), a function may be defined that quantifies error (e.g., a squared error function used in regression techniques). By minimizing error, a neural network may be developed that is capable of categorizing the font. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. The algorithms may be supervised, unsupervised, combinations of supervised and unsupervised, etc. The techniques are based on the learning of multiple levels of features or representations of the data (e.g., font features). As such multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Employing such machine learning techniques, a considerable number of font features may be used as input (e.g., one or more vectors of data representing fifty-eight features) to produce an output that assists in categorizing the font associated with the features. For example, an output data vector may indicate which one or more categories of a group of possible categories (e.g., sixteen categories) the font should be assigned. Along with describing the various font features below, the font categories are also described.

A variety of font features may be employed for using machine learning. For example, tens of features (e.g., 30, 40 features) may be calculated for each font. Such features may be provided by one or more sources; for example, each feature may be derived to assist in separating two or more categories (e.g., "handcrafted"). For example, by deriving one or more features, different font categories may become distinguishable by the font features. In some arrangements, the features may be derived in an automatic manner (e.g., determined by using machine learning techniques), or, some may be derived handcrafted and others by using automatic methodologies. Such features (e.g., fifty-eight features) may also be used to execute other processes along with font pairing determinations. For example, such features may be employed to determine font similarities as described in U.S. patent application Ser. No. 14/046,609, titled "Analyzing Font Similarity for Presentation" and filed on 4 Oct. 2013, which is incorporated by reference here in its entirety.

One or more quantities may be used for defining such features. For example, a quantity may define border pixels positioned on the same horizontal line (e.g., the border pixels align along the 0 degree direction), border pixels that are positioned to the upper right or lower left of each other (e.g., border pixels align along the 45 degree direction), border pixels that are positioned on the same vertical line (e.g., the pixels align along the 90 degree direction), border pixels that are positioned to the upper left or lower right of each other (e.g., border pixels align along the 135 degree direction), etc. Selecting a portion or all of a font glyph may also be used for defining font feature. One or more techniques may be used for such selections (or highlighting of a glyph), for example, a bounding box may be employed such that a minimum sized graphical representation of a box encloses all pixels of the glyph (e.g., all non-white pixels). Other similar techniques may also be employed for defining glyphs.

One such feature may provide a measure of the slant present in a glyph or lack of slant (a vertically aligned glyph). Based upon the amount of slant, if any, each feature may be defined. For example, font features may be labeled as "Direction of the font 0 degree" (dir 0), "Direction of the font 45 degree" (dir 45), "Direction of font 90 degree" (dir 90), "Direction of the font 135 degree" (dir 135), etc. Generally, a font feature with relatively large value for dir90 or dir0 can be considered as being vertically oriented font (with no slant). Alternatively, a font with large value for dir45 or dir135 can be considered a font with slant. To identify such slants, one or more techniques may be implemented; for example, border pixels and non-border pixels may be identified. Border pixels can be considered as having at least one adjacent pixel (of eight possible adjacent pixels) that does not represent the glyph (e.g., the adjacent pixel is colored white). Border pixels may be used to calculate parameters (e.g., dir0, dir45, dir90, dir135) associated with slant directions based on surrounding pixels. For each detected white colored pixel, the corresponding parameter (e.g., dir0, dir45, dir90, dir135) may be incremented. After checking the entire glyph for pixels, each parameter may be divided by the total number of border pixels. In some arrangements, after calculating the direction features for each glyph (e.g., 52 glyphs, 26 small and 26 capital Latin alphabets) an average may be calculated for determining the direction feature for the font. These features can be considered size invariant.

Another font feature that may be produced can be considered as being associated with the center of gravity (e.g., identified as "center of gravity in X coordinate", "center of gravity in Y coordinate", etc.). The center of gravity (COG) can be defined as the point in a glyph from which all adjacent pixels represent a portion of the glyph (e.g., each pixel is non-white pixels in color in order to represent a glyph portion). If the COG is located in the middle of an image, the font can be considered symmetrical. The COG is located elsewhere, the font can be considered non-symmetrical. In one arrangement, to calculate COG in the x-direction, an image is scanned horizontally along its width. For each row, the COG is calculated, for example, by adding the indexes (e.g., position in the row) of the grey and black pixels in the row and dividing this sum by the number of grey and black pixels in the row. If the row is absent of grey or black pixels, the COG may be defined as being located at the middle of the row (e.g., one half the width of the bounding box). For a COG for the complete glyph in the x-direction, the COGs for each row may be added and divided by height of the glyph, the height of a bounding box, etc. Similar operations may be executed to determine the COG in the y-direction. For a COG of an entire font, COGs for each glyph (e.g., 52 glyphs, 26 small and 26 capital Latin alphabets) can be averaged.

For another feature, a quantity may be calculated that is associated with the distance from the center of gravity (referred to as "Average X distance from the Center of Gravity" and "Average Y distance from the Center of Gravity"). In general, this feature represents the distribution of pixels in a glyph. If the glyphs of the font are substantially condensed, the average x-distance and the average y-distance may be represented with relatively low values or even a zero value. Larger feature values may be calculated and represent more expanded glyphs. To calculate the average x-distance for a glyph, the distance of each glyph pixel (e.g., a grey or black pixel) is calculated from the font feature that represents the COG in the x-direction, in one arrangement. The values are summed and divided by the total number of pixels used by the glyph. To produce a size invariant average x-distance, divide the average x-distance by the width of a bounding image. Similar computations may be computed for an average y-distance from the font feature that represents the COG in the y-direction. Similar to the other features, a font feature may be calculated for the font by averaging appropriate distances for a set of glyphs of the font (e.g., 52 glyphs, 26 small and 26 capital Latin alphabets).

For another feature, an aspect ratio quantity may be calculated. Such a ratio may represent the ratio of height to width for a glyph. Such a feature may assist with the machine learning of relatively tall fonts, short fonts, etc. For one example, the aspect ratio may be calculated as:

$$\text{Aspect Ratio} = \text{Height}/(\text{Height} + \text{Width}).$$

However, the other aspect ratio definitions (e.g., that use different quantities) may be employed. To represent an entire font, aspect ratios may be calculated for each individual glyph (e.g., 52 glyphs, 26 small and 26 capital Latin alphabets) and averaged to attain an aspect ratio for the font.

Curviness is another feature that may be calculated that represents the amount of curves present in a font. One technique for calculating such a feature uses the count of glyph border pixels associated with slant angles of 45 or 135 degrees. Once the counts are determined, curviness can be calculated from a ratio:

$$\text{Curviness} = ((\text{borderCount45} + \text{borderCount135})/\text{sqrt}(\text{Height} * \text{Width})).$$

Once the curviness feature is calculated for each individual glyph (52 glyphs, 26 small and 26 capital Latin alphabets) the quantity can be averaged to attain the curviness estimate of the entire font. This feature can be considered size invariant.

The average grey value can also be considered a feature for representing a font. In general, this feature can be considered as representing the heaviness or lightness of a font. In one example, the sum is calculated for pixel values (e.g., intensity values) that vary between 0 (e.g., representing the color white) and 1 (e.g., representing the color black). Once summed, the quantity is divided by the total pixel count for the glyph; for example, AvgGreyValue= ((totalGrey)/(Height*Width)). Once calculated for each individual glyph (e.g., 52 glyphs, 26 small and 26 capital Latin alphabets), the quantities can be averaged to attain the average grey value for the font. This feature can be considered size invariant.

Another feature can assist in determining whether a font can should be considered as being within a particular font category such as a script font category, a symbol font category, etc. One technique for attaining this feature involves positioning a number of lines (e.g., five horizontal lines and five vertical lines) on particular glyphs (e.g., "T", "a", "o", "R", "W", "g", "h", "e"). Once positioned, each line is traversed to determine the number of instances that a color transition occurs (e.g., from the color black to the color white, vice-versa, etc.). The transition count provided by the vertical lines can be defined as the term "Y complexity" and the count from the horizontal lines can be defined as the "X complexity". In one implementation, X and Y complexity values may be calculated for particular glyphs (e.g., "T", "a", "o", "R", "W", "g", "h", and "e") and each value, combinations of the values, etc., may be used as individual features for the font. This feature can be considered size invariant.

Another feature may represent fonts based upon the width of a glyph. In one implementation, this feature may be calculated from the width of a string (e.g., "The quick brown fox jumps over the lazy dog.") at a relatively large point size (e.g., 72 point). If two fonts are generally similar, the value of the string width should be approximately equivalent.

One feature may represent skewness, which is associated with the inclination of a font. To calculate a quantity such as skewness of a glyph, the glyph is skewed by an amount (e.g., in degrees) until the bounding box of the image is minimized. This amount is defined as the skewness of the glyph. In some arrangements, skewness is calculated for particular glyphs (e.g., "H", "I", "T" and "l") and the individual skews are averaged to attain the skewness for the font. This feature can be considered size invariant.

Another feature may represent the width of a histogram for a glyph. A histogram may be defined such that columns represent the number of pixels located within each column along the x-axis. From the histogram, a standard deviation (or variance) is calculated for each column with respect to the average number of pixels in each column. The standard deviations (or variances) are divided by the width of an image bounding box for the glyph to produce a size invariant quantity. Once the feature is calculated for each individual glyph (e.g., 52 glyphs, 26 small and 26 capital Latin alphabets), the quantity can be averaged to attain a histogram for the font. In general, fonts such as swashy fonts, script fonts, etc. have distributions with lower value deviation.

Similar to a font feature for a histogram defined along the x-axis, a similar font may be defined for histograms defined along a y-axis. Once the font feature is computed for each individual glyph (e.g., 52 glyphs, 26 small and 26 capital Latin alphabets), the quantities can be averaged to attain the height histogram feature for the entire font. This feature may also be considered size invariant be executing one or more operations, for example, dividing the value by the height of the bounding box.

For another, a feature represents the stroke width of a font. In one arrangement, the average number of continuous non-white pixels (e.g., grey pixels) for each row along the x-direction of a glyph is identified for a range of heights (e.g., between 40 to 60% of the height of the glyph, in which the glyph has a substantially constant width). Once a numerical value is computed (for this feature) for individual glyphs (e.g., "T", "U", "L" and "I"), an average may be computed to attain the stroke width feature for the font. This feature may be considered size invariant by multiplying the stroke width by the ratio of a reference font size (e.g., 72 point) and the font size of the taken image.

Another feature is the corpus ratio, which refers to a ratio of the distance between the base line of the glyph "x" and the mean line to the cap height of the font. Along with the glyph "x", other glyphs may be used in the computation (e.g., "u", "v", "w", and "z"). In general, this feature calculates corpus size by dividing height of the small letter of "u", "v", "w", "x", and "z" by respective capital letters height and taking average of these values. This feature may be used for identifying fonts that employ all capital fonts, normal Latin fonts, etc. This feature can be considered size invariant.

Some features provide information regarding Latin fonts. For example, features may be computed in order to identify if a font is a Latin font or a symbolic font. If the font is a Latin font, the difference of glyph pair (E&F‖O&Q) is a relatively small amount, while in case of symbolic font, this difference is relatively larger. In general, the number of intersections for symbol fonts is relatively large and reflects the number of instances that there is a transition from a pixel of one color (e.g., white) to a pixel of another color (e.g., grey) and vice versa. Symbol fonts may also have a corpus ratio of approximately 1, meaning capital letters and small case letters are of similar size. For typical Latin fonts, this ratio has a lower value (e.g., 0.6). Also for symbol fonts, the average distance from the center of gravity is relatively large. In one arrangement, a determination may be defined as:

$$\text{Font is Not Latin} = \text{Diffpercent} * \text{int\_}x * \text{pow}(\text{corpusRatio}, 4) * t\_\text{avgDist}/2$$

This feature can be considered size invariant as its parameters are each size invariant.

For yet another, a feature may be computed to identify typeface (serif or non-serif) of the font. In one arrangement, to calculate typeface of the font, an image of a glyph is horizontally skewed to minimize the bounding box which encloses the pixels of the glyph. Produce a histogram along the width of the glyph and calculate maximum height of the histogram. Next, identify columns of the histogram that have at least half of the maximum height and then count the pixels in the respective columns. Divide the pixel count by the total number of non-white pixels in the image. If this ratio is 1 or close to 1 then font can be considered a non-serif type, otherwise font can be considered a serif font. This feature can be calculated to different glyphs such as "I", "i" and "l", and an average can be computed for this feature of the font. This feature can be considered size invariant.

For another feature, a measurement may represent if a font is monospaced or not. In one arrangement, string widths may be determined for particular strings (e.g., "0WWM- Mmm0" and "00IIIlii0") in order to determine if the font is monospaced or not. Once the width values are determined, a value can be computed from the following instructions:

```
isMonoSpaced= (smallStringWIdth / bigStringWIdth) ^ 4;
if ( isMonoSpaced > 1 ) {
    isMonoSpaced = 1 / isMonoSpaced;
}.
```

If the calculated value (labeled "isMonoSpaced") is approximately 1.0, the font can be considered monospaced. If the value is different from 1.0, the font can be considered as not being monospaced. This feature can be considered size invariant.

Another feature represents the x-height of a font, in which the x-height can be considered the distance between a base line of the glyph "x" and a mean line. Typically, this is the height of the letter "x" as well as the letters "u", "v", "w", and "z". This feature calculates height of the small letter of "u", "v", "w", "x", and then take average of these values. This feature is used to identify fonts as having small Latin letters or not. This feature can be considered size invariant by multiplying the value by the ratio of a reference font size (e.g., 72 point) and the font size in the taken image.

Still another feature represents the cap height of a font. Typically, this is the height of the letter "X" in the font, as well as letters "U", "V", "W", and "Z". This feature calculates height of capital letter of "U", "V", "W", "X", and "Z" and then computes average of these values. These features can be used to identify fonts having capital Latin letters or not. This feature can be considered size invariant by multiplying the value by the ratio of a reference font size (e.g., 72 point) and the font size in the taken image.

One feature may represent the contrast between differently oriented character strokes. For example, the feature may represent the contrast of strokes widths oriented in the x-direction and stroke widths oriented in the y-direction for a font. In one arrangement, the feature is calculated from the ratio of the horizontal width of a vertically oriented stroke (e.g., the horizontal width of the stroke that defines the vertical portion of the letter "I") and the vertical width of a horizontally oriented stroke (e.g., the vertical width of the horizontal stroke that defines the middle portion of the letter "H"). In some instances, multiple widths may be determined for a glyph and averaged. This feature can be considered size invariant.

Another feature may be used for classifying fonts based on glyph width. In one implementation, this feature may be calculated from the width of a string (e.g., "The quick brown fox jumps over the lazy dog.") at a relatively large point size (e.g., 72 point), and the calculated width is squared. If two fonts are generally similar, then the square values for each font are generally similar. If the two fonts are relatively dissimilar, the square values may also dissimilar. This feature can be considered size invariant as string width is size invariant.

For another font feature, the distribution of the grey values may be quantified. For example, initially the average grey value is calculated for each glyph (e.g., 52 glyphs). Next the standard deviation is calculated and squared to produce the font feature. This feature can be considered size invariant.

For still another font feature represents if the font is absent lower case letters. Or, in other words, the feature represents if the font only includes capital letters. Such fonts include letters of the same shape, but some letters are sized as typical capital letters and some letters are small variants of the capital letters. Since the letters can be considered as only varying in size, the center of gravity of each letter is position at approximately the same position. The feature is calculated by determining the distance between the center of gravity for the lower case a letter (e.g., "b") and the capital version of the letter (e.g., "B"). In general, if the font includes just capital letters, the distance has an approximate value of 0. For distance values not approximate to 0, the font can be considered as having letters that include capital and lower case letters. This feature can be considered size invariant.

Another font feature quantifies whether the font can be considered filled. One technique for calculating this feature includes horizontally scanning a glyph to potentially identify if pixels change (during the progression) from the color grey to white and then from white to grey. Such a color progression can reflect if the glyph is filled or not (e.g., a pattern of continuous grey pixels may represent that the glyph is filled for that row). By completely scanning the image of the glyph, the number of filled rows and non-filled rows may be counted. These counts may be further processed, e.g., calculate the ratio of filled row count to total rows. The square of this ratio may also be taken. In some arrangements, these operations are executed for particular characters (e.g., "B", "D", "O" and "o"). Once a quantity is calculated for each character, an average may be calculated for representing the font. This feature can be considered size invariant as the ratio of completely filled rows is divided by image height.

Another feature attempts to represent if the font employs stencils. For one technique, the image of the glyph is vertically scanned and one or more columns are identified that are absent grey pixels. If the column represents a portion of the glyph, a ratio may be computed of the total black pixels in the glyph to the white pixels. The ratio may then be squared. A value of "0" is used to represent if the glyph is not present in the column. If stencils are present, a relatively large value is provided by the ratios. Values near "0" represent fonts absent stencils. The image of the glyph may also be scanned horizontally within a bounding box to potentially detect a row in which grey or black pixels are absent. If such a row is detected, a ratio may be similarly calculated for the white pixels to black pixels. In some implementations, the font feature is calculated for particular characters (e.g., "B", "D", "E", "F", "P", "b", "d", "p" and "q"). Once a value is calculated for each, the values are averaged for representing the feature for the entire font. This feature can be considered size invariant.

Another feature may be used to distinguish black-letter fonts from swashy type fonts and fonts considered normal. Black letter fonts have a property of relatively large curviness, average greyness but lower skew values. Fonts considered normal are generally less curvy and include normal levels of greyness. Swashy fonts are generally considered to have large skew values, large amounts of curviness and average greyness. From these quantities, a feature may be defined as:

isNotBlackLetter=pow(skew/(cury*avggrey),2).

Generally, blackletter fonts have low values and fonts considered normal fonts have average values swashy fonts have higher values. This feature can be considered size invariant as the parameters are size invariant.

Another feature may be used to distinguish hollow fonts from fonts considered normal. In general, hollow fonts have a relatively high number of border pixels while fonts considered normal have a lower border pixel count. As such, the border pixel count may be employed as a feature. This feature can be considered size invariant by multiplying the value by the ratio of a reference font size (e.g., 72 point) and the font size in the taken image.

Another feature may have information about the contrast of stroke width in x and y direction for a font. To calculate this feature take the ratio of average horizontal stroke width of the letter 'I' and average vertical stroke width of the middle portion of the letter 'H' is taken. This feature can be considered size invariant.

Another feature can be used to classify fonts based on width of glyph. To calculate this feature, take the width of the string and then square this value. If two fonts are similar, then the square of string width will be similar. If there is small difference in the string width of two fonts, then square of the string width will make both fonts dissimilar more. This feature is invariant as string width is size invariant.

For another feature, fonts are emphasized in which there is high deviation of average grey value of glyphs with respect to the total grey index of font. Idea is to segregate fonts having some glyphs very dense than other glyphs. To calculate this feature first calculate average grey value for the 52 glyphs and then calculate the standard deviation of each glyph with respect to the average grey value of the font. Take the square of the standard deviation as a feature value. This feature is size invariant.

Another feature describes the font has all capital letter or not. All caps font generally have same shape for small variant and capital variant of any alphabet and they only vary in size so the center of gravity lies at approximately the same position. To calculate this feature distance between center of gravity of following pairs are taken ({'b', 'B'}, {'d', 'D'}, {'g', 'G'}, {'h', 'H'}, {'r', 'R'}) is taken and average distance is calculated. If the average value is more than 0.5, then font has capitals font property such as ALL capitals letter or all small letters or small capital letters. Corpus feature value can be checked to identify All Caps font from SmallCaps font (SMCP). Stencil feature is used to check capital to small letters font (C2SP). This feature is size invariant.

Still another feature describes the font has filled font or not. To calculate this feature image is scanned horizontally to width and see the continuous grey pixels. If there is change in pixel from grey to white and then white to grey, then this shows that image is not filled in that row. If pattern is not change and it found continuous grey pixels, then image is filled in that row. Scan Image completely and count number of rows which have filled row. After that, take ratio of filled row count and total row count (bounding height of the image). To get more precise result, take square of this ratio. In current implementation square of the filled row count to total row count is taken for the glyphs 'B', 'D', 'O', 'o' and then take average of this to get this feature. This feature is size invariant as ratio of completely filled rows is divided with height of image.

For another feature, it describes if font is stencils or not. To calculate this feature, image is scanned vertically to height and search the column which doesn't have any grey/black pixel. If such columns found in the glyph, then take the ratio of total grey/black pixels in the glyph to white pixels in these columns and then take square of this ratio. If in the glyph no such column found then typically return 0. This feature typically returns 1 for the fonts which have stencils otherwise return 0. Also the image is scanned horizontally within bounding box to search for a row which has no grey/black pixel. If such a row is found then a similar ratio of white to black pixels is taken. In the current implementation this feature is calculated for the glyphs 'B', 'C', 'D', 'E', 'F', 'O', 'P', 'b', 'c', 'd', 'o', 'p', 'q' and then take the average of these values. This feature is naturally size invariant.

Another feature can assist in distinguish particular fonts (e.g., black-letter fonts) from other types of fonts (e.g., swashy and normal fonts). Blackletter fonts have some typical properties like: the bottom portion of 'o' is very diagonal, capital letters like "T" are not very straight and often has multiple strokes or curve in the vertical stem, never hollow, high contrast, high curviness, average greyness, low skew, high stress, high serifness, highly disconnected, dark pixel percentage is high, not very high on freehand value. diagonal serifness, and, fonts are not all caps or small caps.

For another feature, it is used to distinguish hollow fonts from normal fonts. To calculate hollowness of the font, calculate the number of white pixel in each rows and columns which come between grey pixels and then divide it with boundary box area of the glyph. Calculate hollowness feature for the glyphs "I", "i", "l", "E", "F" and then take the average of these values. This feature is size invariant by multiplying it with the ratio of reference font size (72) and the font size of the image taken.

Another feature can be used to identify fonts in which glyphs overlap in normal text writing. If fonts have connected glyphs, then an overall grey value representing text (e.g., a string) would typically be less than the sum of grey value for each of the individual glyphs. If not, the values would be equivalent. In some arrangements a ratio of grey values may be calculated (e.g., ratio between the sum of individual values for the glyphs and the value for the complete string).

Particular stroke angles can also be used to define features. For example, a stress angle can be considered the angle with respect to the vertical axis at which the stroke of the font is smallest in curved letters like for the character 'o'. For this feature, the total stroke width of the glyph 'o' at different angles is determined. At each angle there will be 2 strokes in the character (e.g., for the character 'o'), e.g., one in top part and other in bottom part. The angle at which this stroke width sum is minimum is defined as the stress angle.

Another feature is used to find fonts that have two story letters such as 'g' and 'a'. To calculate this feature, glyph is scanned (e.g., vertically) and the number of strokes in the glyph is identified. If number of strokes is more than three in glyph (e.g., 'g'), then the glyph is two story glyph otherwise the glyph is considered a single story. Similarly for glyph 'a', number of strokes should be more than two for it to be a double story 'a'.

For still another feature, it is used to distinguish fonts which have more visually light pixels than dark pixels. This feature can be determined by finding the ratio of the total number of pixels having a grey value more than 0.7 to the total number of pixels.

One type of feature can be used to distinguish fonts that don't follow rigid font characteristics like consistent character height, baseline, geometric shapes etc. To calculate this feature, initially a symmetry value of the character (e.g., lower case 'o') is determined, next the standard deviation in height of some characters (e.g., 'a', 'e', 's', 'c', 'o') is determined. Then a value is calculated: freeHand=(2*Curviness)*(1−symmetryValue)*avgStdDev.

Some features can be a measure of glyph edginess. For example, one feature can be used to identify fonts that have sharp edges or turns. Typically fonts have a generally curvy nature in particular characters like lower case 'o'. However, some fonts have edgy characters (even 'o') like blackletter fonts and digital fonts. To calculate this feature, an outer border pixel map is created for lower case 'o'. Next, from any point on the outer curve a path is traversed (e.g., start at point A1 and move along an outer path in one direction for four pixels to the point A4). Next, the slope of the path is calculated (e.g., of a line from point A1 and A4). Now using point (e.g., A4) move to still another point (e.g., A7) and determine the corresponding slope. Repeat this process until all outer pixels have been traversed or the traverse has returned to the starting point. The slope values can be investigated to determine if any consecutive pair have a significant difference (e.g., in angular value) and count can be established as a measure of edginess.

For another, a feature can represent the ratio of a height along one dimension (along the x axis) to the ascension height. The value for the height can be attained from another feature and the ascender height can be determined from the average height of a group of pre-identified characters (e.g., 'b', 'd', 'f', 'h', and 't').

Another feature can be considered to identify if a font is of a digital type (e.g., presents with noticeable points like LED fonts). To determine this feature, the format of the font is investigated to determine if pixel counts drastically change (e.g., from a maximum to a minimum and then from minimum to maximum) similar to LEDs. If the pattern is identified, one value (e.g., "1") is provided, if not another value is used (e.g., the total number of sharp turns in the glyph). Often this values is determined for a pre-identified set of characters (e.g., 'C', 'c', 'O', 'o', 'D', 'E') and the average of the values to then calculated.

Glyph curviness can also be represented by a feature, for example, one feature may be determined by calculating the curviness of the font using selected glyphs. The curviness may be calculated using a border map technique and the a selected glyphs may be predefined (e.g., 'F', 'I', 'L', 'T', 'i', 'l', and 't'). Upon determining the curviness for each, an average can be determined.

Certain shape feature may also be employed, for example, one feature represent a measure of the opening of the lower portion of the glyph 'e' for a font. To calculate this opening (e.g., counter openness), the minimum height of white pixels between black pixels from right side of the glyph 'e' can be calculated. Next, divide this white pixel height with the X-height of the font so that the quantity is invariant to the size of the glyph.

The slant of certain glyphs or portions of glyphs can also be utilized. For example, one feature may represent the slope of the crossbar in the glyph of the character 'e' for a font. From a pair of pixels (e.g., the first and last pixel coordinates of the slanted crossbar), the slope of the crossbar line can be calculated (e.g., in degrees). For example, calculate the first left bottom grey pixel in the crossbar of the character 'e' and find the coordinates of this pixel. Next find the last right bottom grey pixel in the crossbar of 'e' and find the coordinates of this pixel. This feature can be considered to assist in identifying one or more particular fonts (e.g., Italian Old Style fonts).

For another feature, the square shape can be quantified for one or more particular letters (e.g., the character 'o'). This feature is can assist in identify fonts categorized as geometric fonts. For this category of geometric fonts, height and width of the glyph 'o' should be somewhat equivalent. This feature can be determined from the aspect ratio of the glyph (e.g., 'o').

Another features can assist with identifying another category of fonts, such as grotesque fonts. For example a roundness of dots such as a period "." In general, more rounded font have a larger value of curviness and font that appear more square have a smaller value of curviness.

In another feature, standard deviations may be employed, for example, the standard deviation of a glyph width such as an advance width of glyphs defined in the fonts may be used.

Enclosed portions of character, such as the upper portion of the character "a" or the lower portion of the character "e" may be used to define a feature. To determine such a feature, the number of white pixels in the close counter area of the character may be calculated and this quantity can then by divided by the total area of the close counter area. In some instances, the average of the features for 'a' and 'e' can be used to define an overall feature.

For another feature, the standard deviation of the bracketness in the serifs of a font can be calculated. Using this feature based on bracketness, sub serif font types can be identified. For square bracketed fonts the feature can have a value near to a zero, and, for rounded bracketed fonts the value of the standard deviation value can be relatively large. In one arrangement, initially an image of glyph 'h' (e.g., a relatively large image) is de-skewed. Next the total greyness in each column in the bottom left serif part is calculated and the total greyness of the left bottom serif is calculated. Then the standard deviation is calculated for the greyness in the bottom part. Similarly the standard deviation of the greyness in top left serif part is calculated and then the average of two quantities are calculated to provide the sub serif type feature. Fonts that of members of categories such as modern, slab, transitional and Clarendon serifs can be identified from this feature.

In another example of a feature, sub serif greyness for a font can be determined. For this feature the average blackness of top and bottom left serifs of the glyph 'h' are calculated. In general, the value for this feature is large for slab serifs and Clarendon serifs. For fonts in the transitional and modern categories, lower values are typically calculated. Variants of this features may be used for other features, for example, similar operations may be executed on the bottom left serif of the glyph 'h' to provide a feature associated with a wedge serif angle bottom. Other features can be defined using the slope on the top wedge of a serif font, for example, the average standard deviation of the pixels on wedge with this slope line can be calculated. For this particular feature, values near zero are indicative of font categories such as slab, modern, Italian and French. For larger values, the feature would indicate font categories such as transitional and Clarendon.

For another feature, the slant in the top wedge of serif of the glyph 'h' is identified. From the wedge present, e.g., at the top left corner of the glyph, the coordinates of first left bottom grey pixel is identified along with the coordinates of the right last top grey pixel of the wedge. From these coordinates, the slope of this edge is calculated. Slope values near to zero can be considered as indicating the font should be a member of a flat serif font category (e.g., modern category, slab serif category, etc.). For relatively larger values, the font can be considered as a member of a category such as the old style category.

For another, the feature can identify fonts that have more capital letters height than ascender height. For the Sans serif font category, capital height and ascender height (height of the glyph which has ascender) can be nearly equivalent. The height of the font, e.g., cap height, is calculated for the font. Additionally the height of certain glyphs (e.g., 'b', 'd', 'f', 'h', and 't') are determined and averaged to provide the ascender height. The value of the feature can then be calculated as the ratio of cap-height to ascender height.

For still another, a feature can be used to calculate the distribution of thickness in ascender serif. If thickness of serif is considerable and the font can be considered a wedge serif type, then the feature value may be large. In some instances, the standard deviation of greyness value in serif area may be calculated and used in this feature.

In another, a feature can reflected the flaring of one or more stems. For example, the stem of the glyph 'a' may be calculated. Initially, an image of the glyph 'a' is de-skewed. Next the total greyness value of stem in glyph is determined. Calculate the length of stem in x-direction is calculated and then a quantity ("flareStem") is calculated that represents the stem-ness of the font (e.g., flareStem= (totalGreyStem*Stem_length_x/(height*width)).

Various combinations of the features and potentially other features may be determined by the feature detector 302. From the description of features above, fifty-eight features may be determined for each font (e.g., a vector of 58 values is output from the feature detector) and used to categorize each font. Once determined, the features for the font (e.g., the feature vector for the font) are provided to a font learning machine 306. In some instances, the determined font features may be processed prior to input. For example, a vector that represents a collection of font features may be normalized so the data used can be considered as being placed on an equal basis (and one or more particular font features are not over emphasized). Such normalizing operations may take many forms. For example, the estimated value (e.g., average) and standard deviation (or variance) may be calculated for each feature vector (e.g., by calculating an average and standard deviation of the features included in the vector). Once these quantities are calculated (e.g., the average and standard deviation) each of feature in the vector may be normalized, for example, by using an equation:

$$\text{Normalized Vector Feature Value} = \frac{\text{Vector Feature Value} - \text{Average}}{\text{Standard Deviation}}.$$

As illustrated in FIG. 3, other types of functionality may be provided by the modules of the font pairing manager 220. For example, the determined features (e.g., calculated feature vectors) may be stored in a font feature database 308 for later retrieval and use. Such font feature data may be attained from sources other than the feature detector 302. For example, the font learning machine 306 may similarly store data representing font features in the font feature database 308. In some arrangements, such font features may be directly provided to the font learning machine 306 (absent the need of the feature detector 302), and correspondingly stored in the font feature database 308. In other arrangements, calculations may be executed by the font learning machine 306, etc. to produce or assist in producing the font features (prior to being stored in the font feature database 308). For example, numerical values representing one or more font features (e.g., feature vectors) may be computed from font representations (e.g., bitmap images) by the font learning machine 306, etc. Such representations may also include outline-based representations such as outlines of scalable fonts (e.g., vector shapes). In some arrangements, combinations of representations may be utilized, for example, bitmap images and outlines of vector shapes may be used in concert. As illustrated in the figure, such stored font feature data may reside in the storage device 216 (in the font feature database 308). Such font feature data may be provided to or received from other locations internal or external to the font service provider 212. For example, the data may be provided for further analysis, storage, etc. to other systems remotely located from the font service provider 212.

Once provided the font feature data (e.g., fifty-eight features for a particular font), the font learning machine 306 may employ one or more techniques to determine the one or more categories for which the font should be considered for membership. For example, the font learning machine may employ one or more deep learning techniques to arrive at one (or more) categories. In one arrangement, an eight-layer deep learning architecture may be used in which an input layer (e.g., the first layer) includes a number of units. For example, the number of units in this first layer may track the number of potential features used to represent the font (e.g., fifty-eight units for fifty-eight features used to represent a font). Along with the input layer, this deep learning implementation includes six layers (i.e., the second to seventh layers) that each include a number of units (e.g., 96 units) for determining the one or more categories as provided by an output layer (i.e., the eighth layer) that includes a number of units that match the number of possible categories (e.g., sixteen output units for sixteen categories). The output of the font learning machine 306 may be provided in a variety for forms and formats. For example, a vector of values (ranging between 0 and 1.0) may be output in which each value indicates one or more categories that the font should be considered for membership (e.g., relatively high values such as 0.8 and 1.0 indicating appropriate for membership and lower values such as 0.2 and 0.3 indicating not appropriate for membership).

Along with determining the category for an input font, the font learning machine 306 may provide other types of functionality. For example, the output of the font learning machine 306 (e.g., a vector having values indicting appropriate categories) and other quantities may be stored in a font category database 310 (e.g., in the storage device 216) for later retrieval and use.

Once assigned to one of the categories, a font is ready for pairing with one or more other fonts. To perform such pairing, one or more techniques may be employed, for example, in this architecture the font pairing manager 220 includes a font pairing arranger 312 that is capable determining appropriate pairings of the fonts based upon their categories. Additionally, the font paring arranger 312 can perform other operations to prepare the font pairings; for example, other information may be utilized for arranging the font pairings for presentation. In one arrangement, transaction information associated with each font of a font pair, the font pairing itself, etc. can be used by the font pairing arranger 312 to prioritize the presentation of one or more font pairs. Such transaction information can be attained from various sources, for example, information collected at a client computer (via a software agent) may be provided to the font service provider 212 to assist with prioritizing the presentation. The font service provider 212 may also gather such transactional information.

In one arrangement, two quantities (e.g., weights) may be used to assist with pairing determinations. For example, one quantity may represent a level of confidence that the two fonts will be considered an appropriate pairing, and a second quantity may represent the popularity of one or both of the fonts (e.g., based on transaction frequency of the font) in the pairing. As described below, the level of confidence can be provided from data representing subjective reactions to pairings (e.g., a high level in which a pairing is considered exceptional, a lower level in which a pairing is considered good—but not exceptional). Two additional quantities may be defined to assist with scaling the weights, for example, a quantity that represents how much more likely a strong pairing suggestion should be provided compared to a weaker pairing suggestion. Similarly, a quantity can be defined that represents how likely a very popular font (or pair of fonts) should be suggested compared a font (or font pair) of lesser popularity. From these quantities one or more weights may be defined (e.g., by summing, multiplying, scaling, etc. the quantities). For example, a scaled level of confidence quantity can be multiplied by a scaled version of a quantity representing popularity.

Other types of information may also be used to assist with pairing determinations, for example, click data and similar data that reflects the interactions of a user with a particular font may also be employed. For example, the amount of time a pointing device (e.g., a mouse) is hovered over imagery of a font (e.g., a sample of the font) may be monitored (e.g., by a software agent), quantified, and used by the font pairing arranger 312 to adjust the manner in which the pairing are prioritized for presentation. For example, fonts, font pairs, etc. that are frequently included in transactions, interactions with user, etc. may be assigned a higher priority for presentation compared to other font and font pairs that are less frequently licensed, do not attract as much attention of users, etc.

Along with retrieving font category information from the font category database 310, the font pairing arranger 312 may provide other functionality, such as initiating the transmission of information that represents the font pairs to one or more computing devices external to the font service provider 212 (e.g., the computer system 202 that requested the font pairs). The font pairing arranger 312 may also initiate the storage of data that represents the determined font pairing arrangement. As illustrated in the figure, such data may be provided to a font pairing database 314 that resides in the storage device 216. Storing such data generally allows pairing information to be quickly retrieved rather than being re-determined. For example, for each font residing at the font service provider 212, a pairing list for each font may be produced and stored for quick retrieval. Additionally, as newly introduced fonts appear (e.g., are developed and provided to the font service provider 212) operations may be executed to keep the font pairing database 314 updated. Techniques such as batch processing may be implemented for determining a category for each newly introduced font. In some situations multiple new fonts may be introduced together and techniques may be employed to efficiently categorize each and determine pairings among preexisting fonts and the new fonts. By implementing batch processing or other similar techniques, updating of the databases stored at that font service provider 212 may be executed during less busy time periods (e.g., overnight, during weekend hours, etc.). Further, such processing may be prioritized such that more frequently selected font pairings are updated before other pairings. In some arrangements, the information residing in the databases 302, 304, 308, 310 and 314 may also be provided to other locations, internal and external to the font service provider 212, to allow for later retrieval and further analysis.

In the illustrated example shown in FIG. 3, the functionality of the feature detector 300, the font learning machine 306 and the font pairing arranger 312 are presented as being included in the font pairing manager 220. However, in some arrangements, the functionality of one or more of these modules may be provided external from the font pairing manager 220. Similarly, the imagery collection 302, font database 304, font feature database 308, font category database 310 and the font pairing database 314 are stored in the storage device 216 in this example. However, one or more of these databases may be stored external to the storage device 216 and in some arrangements one or more of the databases may be stored external to the font service provider 212. In some arrangements, the font service manager 220 may be implemented in software, hardware, or combinations of hardware and software. Similarly the modules included in the font service manager 220 may individually be implemented in hardware and/or software. One or more database techniques (e.g., structural representations, etc.) may be employed for storing the databases 302, 304, 308, 310, 314.

Referring to FIGS. 4-10, various categories are illustrated may be used for categorizing fonts. These categories can also be employed to define and apply rules for determining font pairing. As provided by the figures, sixteen categories are illustrated that include seven serif font categories (i.e., Italian Old Style 400, French Old Style 402, Dutch Old Style 500, Transitional 502, Modern 600, Clarendon Serif 602, and Slab Serif 700), four sans serif font categories (i.e., Humanist 800, Contemporary Humanist 802, Grotesque 900, and Geometric 902), and four other categories (i.e., Display 1000, Black Letter 1002, Script 1004, and Symbol 1006). As previously described, features of a font (e.g., fifty-eight features) may be used by a font learning machine to determine which one of these sixteen categories that the font should be assigned membership. Once categorized, a collection of rules may be utilized to pair the font with one or more other fonts. Information to define these rules may be provided from various information sources; for example, survey data may provide subjective input for a large number of individuals in regards to appropriate pairing of fonts. Previously implemented pairings (e.g., historical data) may also be enlisted to define the rules used by the font pairing arranger 312 (shown in FIG. 3). In some arrangements such rules may be provided from machine learning techniques. Further, various levels of pairing may be defined; for example, some font pairing may be considered exceptionally suited and defined as a higher level of pairing. In contrast, a lower level may be defined to indicate a good pairing (but not exceptional). More or less levels may be employed and defined by different manners. Such pairing levels can be considered to rate the pairing of fonts. For example, a high level of pairing can be considered a higher rating and a lower level of pairing can be considered as having a lower rating.

As presented in FIGS. 4-10, pairing rules are provided with each category. For example, the Italian old style category 400 is considered as being exceptionally suited (a higher level pairing) with the humanist category 802, and a good pairing (a lower level pairing) with the contemporary humanist category 800. The French old style 402 is exceptionally suited (a higher level pairing) with both the humanist category 802 and the contemporary humanist category 800. The Dutch old style category 500 is considered as being exceptionally suited (a higher level pairing) with both the contemporary humanist 800 and the humanist category 802, and, is a good pairing (lower level pairing) with the grotesque category 902. The transitional category 502 is considered as being exceptionally suited (a higher level pairing) with both the contemporary humanist 800 and the grotesque category 902, and, is a good pairing (a lower level pairing) with the humanist category 802. The modern category 600 is considered as being exceptionally suited (a higher level pairing) with both the contemporary humanist 800 and the grotesque category 902. The Clarendon serif category 602 is considered as being exceptionally suited (a higher level pairing) with both the contemporary humanist 800 and the grotesque category 902, and is a good pairing (a lower level pairing) with the geometric category 900. The slab serif category 700 is considered as being exceptionally suited (a higher level pairing) with the contemporary humanist 800, the grotesque category 902, and the geometric category 900. While these rules may be implemented in the described system, other rules may be used independently or in combination with these rules. Further, while some categories may be well-suited for others or just a good fit, different levels of pairing may be defined. For example, some font categories may not lend well being paired at all. The four categories presented in FIG. 10 (i.e., display category 1000, black letter category 1002, script category 1004, and symbol category 1006) may be considered as not being well suited to pair with any other category. As such, the font pairing arranger 312 may not pair any font assigned membership in one of these four font categories.

Once paired, various presentation techniques may be employed (e.g., by the interface 104); for example, pairing may be provided in a listing that includes samples of the pairing (as shown in FIG. 1). Techniques may be employed to increase a viewer's interest, for example, so that the viewer spends more time to look at many pairing possibilities and potentially become interested in more font and font pair transactions. In one arrangement, the confidence level, the transaction information, etc. may be used to define a probability of interest in a font pair (e.g., 1.0 representing high probability and 0.0 representing low or no probability). From these probability values a stochastic process such as a roulette wheel stochastic process may be employed for presenting the font pairs (e.g., a font pair with a high probability is assigned a larger presentation selection slot compared to a font pair with a lower probability).

Figure 11:
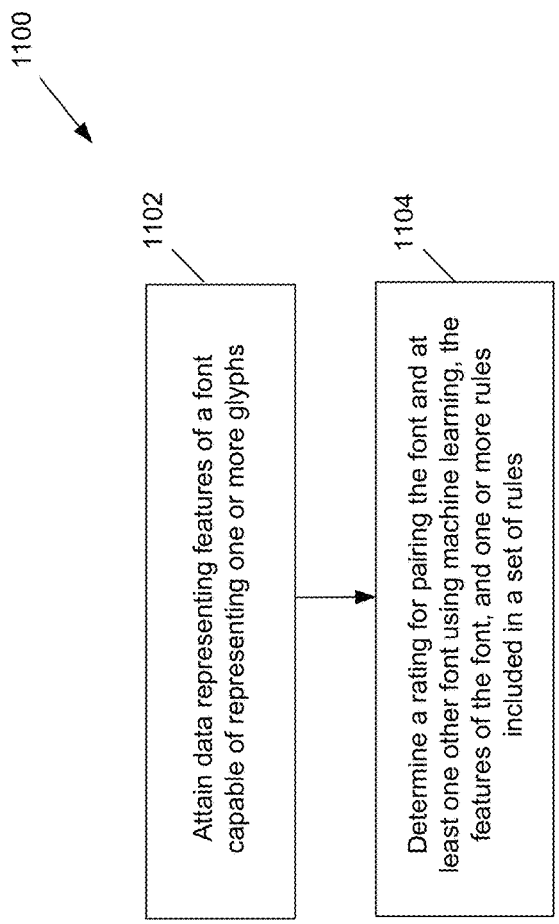
FIG. 11 is an example flow chart of font service manager operations.

Referring to FIG. 11, a flowchart 1100 represents operations of a font pairing manager (e.g., the font pairing manager 220 shown in FIG. 3). Operations of the font pairing manager 220 are typically executed by a single computing device (e.g., the server 218); however, operations of the font pairing manager may be executed by multiple computing devices. Along with being executed at a single site (e.g., the font service provider 212), the execution of operations may be distributed among two or more locations.

Operations of the font pairing manager may include attaining 1102 data representing features of a font capable of representing one or more glyphs. For example, data representing features (e.g., skewness, a stroke width ratio, etc.) may be received for a font. In some arrangements the features for the font may be represented as a vector of font features. The vector may include numerical values that represent the font features (e.g., font curviness, center of gravity, etc.). Operations may also include determining 1104 a rating for pairing the font and at least one other font using machine learning, the features of the font, and one or more rules included in a set of rules. For example, the features of the font may be used by one or more machine learning techniques to determine numerical values that represent whether the font should be assigned membership to one or more categories. Categorized, one or more rules can be used to determine pairings of this font and one or more other fonts, e.g., for presentation.

Figure 12:
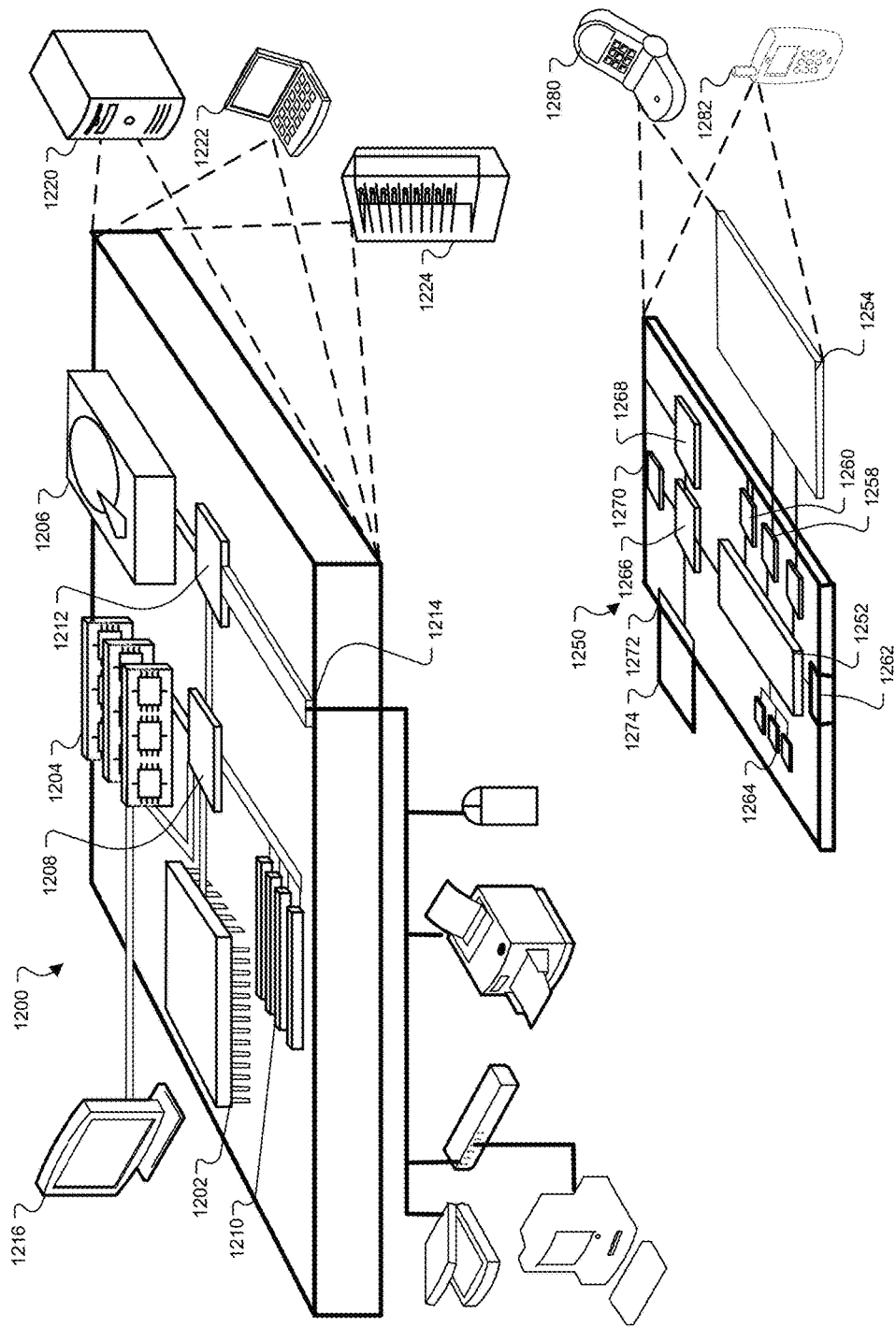
FIG. 12 illustrates an example of a computing device and a mobile computing device that can be used to implement the techniques described here.

FIG. 12 shows an example of example computer device 1200 and example mobile computer device 1250, which can be used to implement the techniques described herein. For example, a portion or all of the operations of the font service manager 220 (shown in FIG. 3) or the software agent 206 (shown in FIG. 2) may be executed by the computer device 1200 and/or the mobile computer device 1250. Computing device 1200 is intended to represent various forms of digital computers, including, e.g., laptops, desktops, workstations, personal digital assistants, servers, blade servers, mainframes, and other appropriate computers. Computing device 1250 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1200 includes processor 1202, memory 1204, storage device 1206, high-speed interface 1208 connecting to memory 1204 and high-speed expansion ports 1210, and low speed interface 1212 connecting to low speed bus 1214 and storage device 1206. Each of components 1202, 1204, 1206, 1208, 1210, and 1212, are interconnected using various busses, and can be mounted on a common motherboard or in other manners as appropriate. Processor 1202 can process instructions for execution within computing device 1200, including instructions stored in memory 1204 or on storage device 1206 to display graphical data for a GUI on an external input/output device, including, e.g., display 1216 coupled to high speed interface 1208. In other implementations, multiple processors and/or multiple busses can be used, as appropriate, along with multiple memories and types of memory. Also, multiple computing devices 1200 can be connected, with each device providing portions of the necessary operations (e.g., as a server bank, a group of blade servers, or a multi-processor system).

Memory 1204 stores data within computing device 1200. In one implementation, memory 1204 is a volatile memory unit or units. In another implementation, memory 1204 is a non-volatile memory unit or units. Memory 1204 also can be another form of computer-readable medium (e.g., a magnetic or optical disk. Memory 1204 may be non-transitory.)

Storage device 1206 is capable of providing mass storage for computing device 1200. In one implementation, storage device 1206 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1204, storage device 1206, memory on processor 1202, and the like.)

High-speed controller 1208 manages bandwidth-intensive operations for computing device 1200, while low speed controller 1212 manages lower bandwidth-intensive operations. Such allocation of functions is an example only. In one implementation, high-speed controller 1408 is coupled to memory 1204, display 1216 (e.g., through a graphics processor or accelerator), and to high-speed expansion ports 1210, which can accept various expansion cards (not shown). In the implementation, low-speed controller 1212 is coupled to storage device 1206 and low-speed expansion port 1214. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1200 can be implemented in a number of different forms, as shown in the figure. For example, it can be implemented as standard server 1220, or multiple times in a group of such servers. It also can be implemented as part of rack server system 1224. In addition or as an alternative, it can be implemented in a personal computer (e.g., laptop computer 1222.) In some examples, components from computing device 1200 can be combined with other components in a mobile device (not shown), e.g., device 1250. Each of such devices can contain one or more of computing device 1200, 1250, and an entire system can be made up of multiple computing devices 1200, 1250 communicating with each other.

Computing device 1250 includes processor 1252, memory 1264, an input/output device (e.g., display 1254, communication interface 1266, and transceiver 1268) among other components. Device 1450 also can be provided with a storage device, (e.g., a microdrive or other device) to provide additional storage. Each of components 1250, 1252, 1264, 1254, 1266, and 1468, are interconnected using various buses, and several of the components can be mounted on a common motherboard or in other manners as appropriate.

Processor 1252 can execute instructions within computing device 1250, including instructions stored in memory 1264. The processor can be implemented as a chipset of chips that include separate and multiple analog and digital processors. The processor can provide, for example, for coordination of the other components of device 1250, e.g., control of user interfaces, applications run by device 1250, and wireless communication by device 1250.

Processor 1252 can communicate with a user through control interface 1258 and display interface 1256 coupled to display 1254. Display 1254 can be, for example, a TFT LCD (Thin-Film-Transistor Liquid Crystal Display) or an OLED (Organic Light Emitting Diode) display, or other appropriate display technology. Display interface 1256 can comprise appropriate circuitry for driving display 1254 to present graphical and other data to a user. Control interface 1258 can receive commands from a user and convert them for submission to processor 1252. In addition, external interface 1262 can communicate with processor 1242, so as to enable near area communication of device 1250 with other devices. External interface 1262 can provide, for example, for wired communication in some implementations, or for wireless communication in other implementations, and multiple interfaces also can be used.

Memory 1264 stores data within computing device 1250. Memory 1264 can be implemented as one or more of a computer-readable medium or media, a volatile memory unit or units, or a non-volatile memory unit or units. Expansion memory 1274 also can be provided and connected to device 1250 through expansion interface 1272, which can include, for example, a SIMM (Single In Line Memory Module) card interface. Such expansion memory 1274 can provide extra storage space for device 1250, or also can store applications or other data for device 1250. Specifically, expansion memory 1274 can include instructions to carry out or supplement the processes described above, and can include secure data also. Thus, for example, expansion memory 1274 can be provided as a security module for device 1250, and can be programmed with instructions that permit secure use of device 1250. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1264, expansion memory 1274, and/or memory on processor 1252), which can be received, for example, over transceiver 1268 or external interface 1262.

Device 1250 can communicate wirelessly through communication interface 1266, which can include digital signal processing circuitry where necessary. Communication interface 1266 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1268. In addition, short-range communication can occur, e.g., using a Bluetooth®, WiFi, or other such transceiver (not shown). In addition, GPS (Global Positioning System) receiver module 1270 can provide additional navigation- and location-related wireless data to device 1250, which can be used as appropriate by applications running on device 1250. Sensors and modules such as cameras, microphones, compasses, accelerators (for orientation sensing), etc. may be included in the device.

Device 1250 also can communicate audibly using audio codec 1260, which can receive spoken data from a user and convert it to usable digital data. Audio codec 1260 can likewise generate audible sound for a user, (e.g., through a speaker in a handset of device 1250.) Such sound can include sound from voice telephone calls, can include recorded sound (e.g., voice messages, music files, and the like) and also can include sound generated by applications operating on device 1250.

Computing device 1250 can be implemented in a number of different forms, as shown in the figure. For example, it can be implemented as cellular telephone 1280. It also can be implemented as part of smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
   attaining data representing features of a font capable of representing one or more glyphs; and
   determining a rating for pairing the font and at least one other font using a machine learning system and the data representing the features of the font, wherein at least one of the features or at least one category of a set of categories is identified to represent the font by the machine learning system using the features of the font, and wherein the machine learning system produces a vector of numerical values, each numerical value represents one of the features or one of the categories in the set of categories.

2. The computing device implemented method of claim 1, further comprising:
   initiating presentation of the pairing of the font and the at least one other font.

3. The computing device implemented method of claim 2, wherein initiating presentation of the pairing of the font and the at least one other font includes prioritizing the pairing for presentation based upon customer interest.

4. The computing device implemented method of claim 3, wherein customer interest includes transaction information of the pairing of the font and the at least one other font.

5. The computing device implemented method of claim 2, wherein initiating presentation of the pairing of the font and the at least one other font includes prioritizing the pairing for presentation based upon a stochastic process.

6. The computing device implemented method of claim 2, wherein initiating presentation includes providing a user interface that presents the pairing of the font and the at least one other font.

7. The computing device implemented method of claim 1, wherein the machine learning system uses a deep learning technique.

8. The computing device implemented method of claim 1, wherein at least one category is not pairable with another of the categories.

9. The computing device implemented method of claim 1, wherein the features are derived based upon separating two or more categories.

10. The computing device implemented method of claim 1, wherein the features are derived in an automatic manner.

11. The computing device implemented method of claim 1, wherein a portion of the features are derived in an automatic manner and a portion of the features are derived based upon separating two or more categories.

12. The computing device implemented method of claim 1, wherein determining the rating for pairing the font and the at least one other font uses a set of rules.

13. The computing device implemented method of claim 1, wherein determining the rating for pairing the font and the at least one other font uses a ruling provided by the machine learning system.

14. The computing device implemented method of claim 1, wherein the features are attained from one or more bitmaps of one or more characters of the font.

15. The computing device implemented method of claim 1, wherein the features are attained from one or more outlines of one or more characters of the font.

16. The computing device implemented method of claim 1, wherein the features of the font are employed to determine font similarity.

17. The computing device implemented method of claim 1, wherein one of the features of the font represents squareness of one or more characters of the font.

18. A system comprising:
   a computing device comprising:
   a memory configured to store instructions; and
   a processor to execute the instructions to perform operations comprising:
      attaining data representing features of a font capable of representing one or more glyphs; and
      determining a rating for pairing the font and at least one other font using a machine learning system and the data representing the features of the font, wherein at least one of the features or at least one category of a set of categories is identified to represent the font by the machine learning system using the features of the font, and wherein the machine learning system produces a vector of numerical values, each numerical value represents one of the features or one of the categories in the set of categories.

19. The system of claim 18, the operations further comprising:
    initiating presentation of the pairing of the font and the at least one other font.

20. The system of claim 19, wherein initiating presentation of the pairing of the font and the at least one other font includes prioritizing the pairing for presentation based upon customer interest.

21. The system of claim 20, wherein customer interest includes transaction information of the pairing of the font and the at least one other font.

22. The system of claim 19, wherein initiating presentation of the pairing of the font and the at least one other font includes prioritizing the pairing for presentation based upon a stochastic process.

23. The system of claim 19, wherein initiating presentation includes providing a user interface that presents the pairing of the font and the at least one other font.

24. The system of claim 18, wherein the machine learning system uses a deep learning technique.

25. The system of claim 18, wherein at least one category is not pairable with another of the categories.

26. The system of claim 18, wherein the features are derived based upon separating two or more categories.

27. The system of claim 18, wherein the features are derived in an automatic manner.

28. The system of claim 18, wherein a portion of the features are derived in an automatic manner and a portion of the features are derived based upon separating two or more categories.

29. The system of claim 18, wherein determining the rating for pairing the font and the at least one other font uses a set of rules.

30. The system of claim 18, wherein determining the rating for pairing the font and the at least one other font uses a ruling provided by the machine learning system.

31. The system of claim 18, wherein the features are attained from one or more bitmaps of one or more characters of the font.

32. The system of claim 18, wherein the features are attained from one or more outlines of one or more characters of the font.

33. The system of claim 18, wherein the features of the font are employed to determine font similarity.

34. The system of claim 18, wherein one or the features of the font represents squareness of one or more characters of the font.

35. One or more non-transitory computer readable media storing instructions that are executable by a processing device, and upon such execution cause the processing device to perform operations comprising:
    attaining data representing features of a font capable of representing one or more glyphs; and
    determining a rating for pairing the font and at least one other font using a machine learning system and the data representing the features of the font, wherein at least one of the features or at least one category of a set of categories is identified to represent the font by the machine learning using the features of the font, and wherein the machine learning system produces a vector of numerical values, each numerical value represents one of the features or one of the categories in the set of categories.

36. The non-transitory computer readable media of claim 35, the operations further comprising:
    initiating presentation of the pairing of the font and the at least one other font.

37. The non-transitory computer readable media of claim 36, wherein initiating presentation of the pairing of the font and the at least one other font includes prioritizing the pairing for presentation based upon customer interest.

38. The non-transitory computer readable media of claim 37, wherein customer interest includes transaction information of the pairing of the font and the at least one other font.

39. The non-transitory computer readable media of claim 36, wherein initiating presentation of the pairing of the font and the at least one other font includes prioritizing the pairing for presentation based upon a stochastic process.

40. The non-transitory computer readable media of claim 36, wherein initiating presentation includes providing a user interface that presents the pairing of the font and the at least one other font.

41. The non-transitory computer readable media of claim 35, wherein the machine learning system uses a deep learning technique.

42. The non-transitory computer readable media of claim 35, wherein at least one category is not pairable with another of the categories.

43. The non-transitory computer readable media of claim 35, wherein the features are derived based upon separating two or more categories.

44. The non-transitory computer readable media of claim 35, wherein the features are derived in an automatic manner.

45. The non-transitory computer readable media of claim 35, wherein a portion of the features are derived in an automatic manner and a portion of the features are derived based upon separating two or more categories.

46. The non-transitory computer readable media of claim 35, wherein determining the rating for pairing the font and the at least one other font uses a set of rules.

47. The non-transitory computer readable media of claim 35, wherein determining the rating for pairing the font and the at least one other font uses a ruling provided by the machine learning system.

48. The non-transitory computer readable media of claim 35, wherein the features are attained from one or more bitmaps of one or more characters of the font.

49. The non-transitory computer readable media of claim 35, wherein the features are attained from one or more outlines of one or more characters of the font.

50. The non-transitory computer readable media of claim 35, wherein the features of the font are employed to determine font similarity.

51. The non-transitory computer readable media of claim 35, wherein one or more features of the font represents squareness of one or more characters of the font.

* * * * *

UNITED STATES PATENT AND TRADEMARK OFFICE
CERTIFICATE OF CORRECTION

PATENT NO. : 10,115,215 B2
APPLICATION NO. : 14/690260
DATED : October 30, 2018
INVENTOR(S) : Steve Matteson et al.

Page 1 of 1

It is certified that error appears in the above-identified patent and that said Letters Patent is hereby corrected as shown below:

In the Claims

Column 29, Line 45 (Claim 34): Delete "or" and insert -- of --, therefor.

Signed and Sealed this
Second Day of July, 2019

Andrei Iancu
*Director of the United States Patent and Trademark Office*